(12) United States Patent
Min et al.

(10) Patent No.: US 11,704,394 B2
(45) Date of Patent: Jul. 18, 2023

(54) APPARATUS AND METHOD FOR AUTHENTICATING OBJECT IN ELECTRONIC DEVICE

(71) Applicant: Samsung Electronics Co., Ltd., Gyeonggi-do (KR)

(72) Inventors: Hyunkee Min, Gyeonggi-do (KR); Bokun Choi, Gyeonggi-do (KR); Jongmu Choi, Gyeonggi-do (KR); Sunkee Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 780 days.

(21) Appl. No.: 16/504,410

(22) Filed: Jul. 8, 2019

(65) Prior Publication Data
US 2020/0019686 A1    Jan. 16, 2020

(30) Foreign Application Priority Data
Jul. 11, 2018    (KR) .......................... 10-2018-0080513

(51) Int. Cl.
*G01S 13/86*    (2006.01)
*G06F 21/32*    (2013.01)
(Continued)

(52) U.S. Cl.
CPC ................ *G06F 21/32* (2013.01); *G01S 7/41* (2013.01); *G01S 13/867* (2013.01); *H04W 12/06* (2013.01); *H01Q 21/00* (2013.01)

(58) Field of Classification Search
CPC .......... G01S 7/41; G01S 13/867; H01Q 21/00
See application file for complete search history.

(56) References Cited

U.S. PATENT DOCUMENTS 5,953,054 A    9/1999   Mercier
8,411,909 B1   4/2013   Zhao et al.
(Continued)

FOREIGN PATENT DOCUMENTS

KR    10-2016-0125778 A    11/2016
KR       10-1726940 B1     4/2017
(Continued)

OTHER PUBLICATIONS

International Search Report dated Oct. 15, 2019.
(Continued)

*Primary Examiner* — Erin F Heard
*Assistant Examiner* — Hailey R Le
(74) *Attorney, Agent, or Firm* — Cha & Reiter, LLC

(57) ABSTRACT

In accordance with an aspect of the disclosure, an electronic device is provided. The electronic device comprises an antenna array, a wireless communication module electrically connected to the antenna array and configured to form directional beams through the antenna array, at least one processor operatively connected to the wireless communication module; and a memory operatively connected to the at least one processor. The memory stores instructions causing the at least one processor to perform a plurality of operations comprising: transmitting a sequence of first directional beams having a first beam width to scan first regions having a first size through the antenna array, receiving a sequence of first reflected waves generated by reflection of the sequence of the first directional beams from an object through the antenna array, transmitting a sequence of second directional beams having a second beam width narrower than the first beam width to scan second regions, which are included in the first regions and have a second size smaller than the first size, through the antenna array based on at least a portion of the received sequence of the first reflected (Continued)

waves, receiving a sequence of second reflected waves generated by reflection of the sequence of the second directional beams from the object through the antenna array, and authenticating the object based on at least a portion of the sequence of the second reflected waves.

10 Claims, 18 Drawing Sheets

(51) Int. Cl.
*H04W 12/06* (2021.01)
*G01S 7/41* (2006.01)
*H01Q 21/00* (2006.01)

(56) References Cited

U.S. PATENT DOCUMENTS

| | | | |
|---|---|---|---|
| 10,115,029 B1* | 10/2018 | Day | G06V 20/59 |
| 2005/0231421 A1 | 10/2005 | Fleisher et al. | |
| 2007/0001897 A1* | 1/2007 | Alland | G01S 7/352 |
| | | | 342/158 |
| 2010/0002912 A1 | 1/2010 | Solinsky | |
| 2015/0172264 A1 | 6/2015 | Hardy | |
| 2015/0222025 A1* | 8/2015 | Song | H01Q 21/24 |
| | | | 343/893 |
| 2015/0262024 A1 | 9/2015 | Braithwaite et al. | |
| 2016/0019421 A1 | 1/2016 | Feng et al. | |
| 2016/0063235 A1 | 3/2016 | Tussy | |
| 2017/0124384 A1 | 5/2017 | Allyn | |
| 2017/0317729 A1* | 11/2017 | Kobayashi | H04W 64/006 |
| 2019/0104549 A1* | 4/2019 | Deng | H04L 27/2607 |

FOREIGN PATENT DOCUMENTS

| | | | | |
|---|---|---|---|---|
| KR | 101726940 B1 * | 4/2017 | | |
| WO | 2016/086144 A1 | 6/2016 | | |
| WO | 2017/062566 A1 | 4/2017 | | |
| WO | WO-2017062566 A1 * | 4/2017 | | A63F 13/21 |

OTHER PUBLICATIONS

European Search Report dated Mar. 4, 2021.
Indian Search Report dated May 28, 2021.
Notice of Preliminary Rejection dated Sep. 9, 2022.
Notice of Patent Grant dated Jan. 13, 2023.
European Office Action dated Feb. 13, 2023.

* cited by examiner

APPARATUS AND METHOD FOR AUTHENTICATING OBJECT IN ELECTRONIC DEVICE

CROSS-REFERENCE TO RELATED APPLICATION(S)

This application is based on and claims priority under 35 U.S.C. 119 to Korean Patent Application No. 10-2018-0080513, filed on Jul. 11, 2018, in the Korean Intellectual Property Office, the disclosure of which is herein incorporated by reference in its entirety.

BACKGROUND

1) Field

The disclosure relates to an apparatus and a method for authenticating an object in an electronic device.

2) Description of Related Art

The above information is presented as background information only to assist with an understanding of the disclosure. No determination has been made, and no assertion is made, as to whether any of the above might be applicable as prior art with regard to the disclosure.

As the performance of electronic devices has improved, the variety of services and additional functions provided through the electronic device has gradually expanded. In order to increase the value of the electronic devices and meet various demands of users, various applications that are executable by the electronic device have been developed.

Due to the high amount of personal data that an electronic device may carry, it becomes important to verify authorization of the user before providing access to the electronic device.

SUMMARY

In accordance with an aspect of the disclosure, an electronic device is provided. The electronic device comprises an antenna array, a wireless communication module electrically connected to the antenna array and configured to form directional beams through the antenna array, at least one processor operatively connected to the wireless communication module; and a memory operatively connected to the at least one processor. The memory stores instructions causing the at least one processor to perform a plurality of operations comprising: transmitting a sequence of first directional beams having a first beam width to scan first regions having a first size through the antenna array, receiving a sequence of first reflected waves generated by reflection of the sequence of the first directional beams from an object through the antenna array, transmitting a sequence of second directional beams having a second beam width narrower than the first beam width to scan second regions, which are included in the first regions and have a second size smaller than the first size, through the antenna array based on at least a portion of the received sequence of the first reflected waves, receiving a sequence of second reflected waves generated by reflection of the sequence of the second directional beams from the object through the antenna array, and authenticating the object based on at least a portion of the sequence of the second reflected waves.

In accordance with another aspect of the disclosure, there is provided an electronic device. The electronic device comprises a camera, an antenna array, a wireless communication module electrically connected to the antenna array and configured to form directional beams through the antenna array, a sensor module configured to sense an intensity of illumination, and at least one processor operatively connected to the camera, the wireless communication module, and the sensor module. The at least one processor is configured to identify brightness around the electronic device through the sensor module, perform a first object authentication operation through the antenna array and the wireless communication module when the sensed brightness is equal to or lower than a set level, and perform a second object authentication operation through the camera, the antenna array and the wireless communication module when the sensed brightness is higher than the set level. The first object authentication operation transmits a sequence of first directional beams having a first beam width to scan first regions having a first size through the antenna array, receives a sequence of first reflected waves generated by reflection of the sequence of the first directional beams from an object through the antenna array, transmits a sequence of second directional beams having a second beam width narrower than the first beam width to scan second regions, which are included in the first regions and have a second size smaller than the first size, through the antenna array based on at least a portion of the received sequence of the first reflected waves, receives a sequence of second reflected waves generated by reflection of the sequence of the second directional beams from the object through the antenna array, and authenticates the object based on at least a portion of the sequence of the second reflected waves.

In accordance with another aspect of the disclosure there is presented a method of authenticating an object by an electronic device. The method comprises transmitting a sequence of first directional beams having a first beam width to scan first regions having a first size through an antenna array, receiving a sequence of first reflected waves generated by reflection of the sequence of the first directional beams from an object through the antenna array, transmitting a sequence of second directional beams having a second beam width narrower than the first beam width to scan second regions, which are included in the first regions and have a second size smaller than the first size, through the antenna array based on at least a portion of the received sequence of the first reflected waves, receiving a sequence of second reflected waves generated by reflection of the sequence of the second directional beams from the object through the antenna array, and authenticating the object based on at least a portion of the sequence of the second reflected waves.

In accordance with another aspect of the disclosure, a method of authenticating an object by an electronic device is provided. The method includes: sensing a brightness around the electronic device through a sensor module; performing a first object authentication operation through an antenna array and a wireless communication module when the sensed brightness is lower than a set level; and performing a second object authentication operation for authenticating the object through an image acquired by a camera and signals received through the antenna array and the wireless communication module when the sensed brightness is higher than the set level. The first object authentication operation may transmit a sequence of first directional beams having a first beam width to scan first regions having a first size through the antenna array, receive a sequence of first reflected waves generated by reflection of the sequence of the first directional beams from an object through the antenna array, transmit a sequence of second directional beams having a second beam width narrower than the first beam width to scan second regions, which are included in the first regions and have a second size smaller than the first size, through the antenna array based on at least a portion of the received sequence of the first reflected waves, receive a sequence of second reflected waves generated by reflection of the sequence of the second directional beams from the object through the antenna array, and authenticate the object based on at least a portion of the sequence of the second reflected waves.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments of the disclosure will be described in detail with reference to the accompanying drawings.

As the performance of electronic devices has improved, the variety of services and additional functions provided through the electronic device has gradually expanded. In order to increase the value of the electronic devices and meet various demands of users, various applications that are executable by the electronic device have been developed.

Among the applications are applications related to a camera function, and a user may capture themselves or a background through a camera module mounted to the electronic device. For example, the electronic device may perform an authentication function on the basis of an image of an object captured using the camera module. For example, the object may be a face or an iris.

Face recognition mechanisms mainly used by an electronic device may use a method using only an image of an object acquired by an RGB camera or a method of authenticating an object by combining an image of an object acquired by an RGB camera and depth information acquired by a depth camera. The method using only the image of the object acquired by the RGB camera may be vulnerable to manipulation by a third party (for example, malicious spoofing attacks using photos or images stored in a smart phone). For, the method using both the RGB camera and the depth camera, the electronic device is required to include a plurality of camera modules, and it may be difficult for the electronic device to use the method of authenticating the object through the cameras when ambient brightness is low.

The electronic device according to certain embodiments may provide an apparatus and a method for authenticating an object through a wireless communication module.

The electronic device according to certain embodiments may provide an apparatus and a method for authenticating an object through a millimeter-wave device when ambient brightness is out of a specific range.

A method of authenticating an object by an electronic device according to certain embodiments can rapidly search for sections in which the object exists by estimating the location of the object through beamforming of wide beams and authenticate the object through beamforming of narrow beams in sections in which object exists.

According to certain embodiments, the electronic device includes a camera and a wireless communication module, and is able to acquire object information through the camera and the wireless communication module when brightness around a subject is brighter than or equal to a set brightness and acquire object information through the wireless communication module when brightness around the subject is darker than the set brightness, so as to authenticate the object.

The electronic device according to certain embodiments can perform an object authentication operation through a millimeter-wave device without information on an image of an object.

Figure 1:
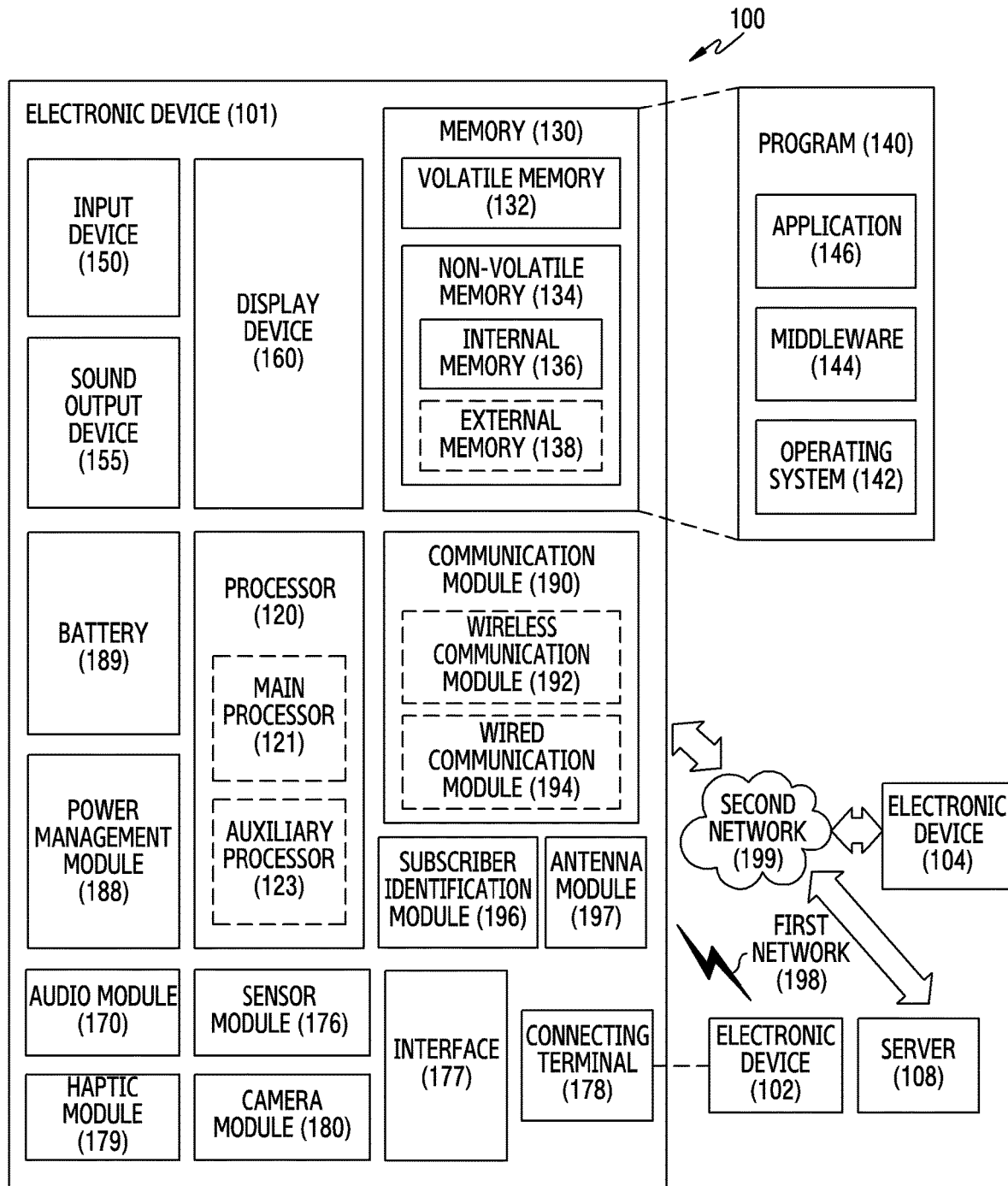
FIG. 1 is a block diagram illustrating an electronic device within a network environment according to certain embodiments.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120 (hereinafter, "a processor" shall include both the singular context and the plural context), memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, instructions stored in the memory 130 (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

An electronic device according to certain embodiments disclosed herein may be various types of devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wiredly), wirelessly, or via a third element.

As used herein, the term "module" may include a unit implemented in hardware, or hardware storing instructions, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as memory storing executable instructions which electrically, chemically, or magnetically alter the memory (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the invoked at least one instruction. The one or more instructions may include a code generated by a complier or a code executable by an interpreter. The machine-readable storage media may be provided in the form of non-transitory storage media. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more components of the above-described components or operations may be omitted, or one or more other components or operations may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
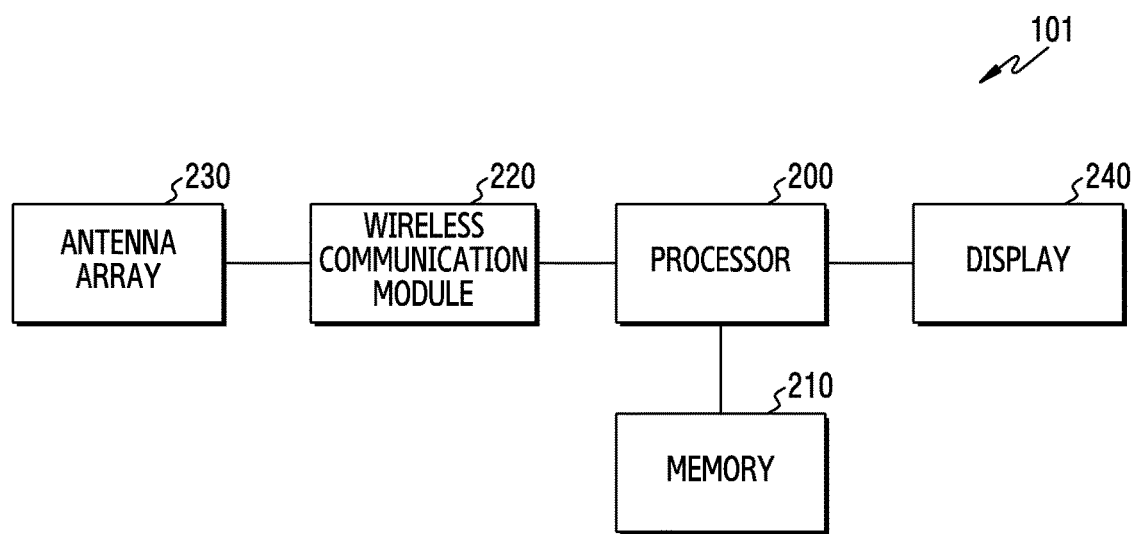
FIG. 2 illustrates the configuration of an electronic device according to certain embodiments.

FIG. 2 illustrates the configuration of an electronic device (for example, the electronic device 101 of FIG. 1) according to certain embodiments.

Referring to FIG. 2, the electronic device 101 may include a processor 200, a memory 210, a wireless communication module 220, an antenna array 230, and a display 240.

In certain embodiments, the electronic device 101 is configured to authenticate an object by transmitting directional beams by the antenna array 230, and receiving reflected signals. The antenna array 230 can be controlled by the processor 200. The processor 200 can executed instructions that are stored in the memory 210.

In certain embodiments, the processor 200 can control the antenna array 230 to transmit first direction beams having a first beam width through the antenna array. The antenna array can then receive a sequence of first reflected waves generated by reflection of the first direction beams. The processor can then cause the antenna array to transmit narrower beams and authenticate the object based on at least a portion of the sequence of the reflected waves from the narrower beams.

The electronic device 101 may include a housing (not shown). The housing may include a first plate facing a first direction, a second plate facing a direction opposite that of the first plate, and a side member surrounding a space between the first plate and the second plate.

The wireless communication module 220 (for example, the wireless communication module 192 of FIG. 1) may be electrically connected to the antenna array 230, and may be configured to form a directional beam through the antenna array. For example, the wireless communication module 220 may be a millimeter (mm)-wave device, and may be configured to transmit and/or receive frequencies from 3 GHz to 100 GHz. The antenna array 230 may be disposed inside and/or on a portion of the housing. The antenna array 230 may transmit a sequence of at least one directional beam in the second direction through the selected antenna array 230.

The display 240 (for example, the display device 160 of FIG. 1) may visually provide information (for example, images captured by the camera module) to the outside of the electronic device 101. The display 240 may be exposed through a first part of the first plate of the housing.

The memory 210 (for example, the memory 130 of FIG. 1) may store various data used by the processor 200. The memory 210 may store executable instructions (for example, the program 140 of FIG. 1) to drive a learning engine for recognizing a reflected wave received by the wireless communication module 220.

According to certain embodiments, the memory 210 may store instructions causing the processor 200 to perform operations of configuring a beam width and authenticating an object. The instructions stored in the memory 210 may cause the processor 200 to transmit a sequence of first directional beams having a first beam width in order to scan a first region outside the housing having a first area through the antenna array 230. The instructions stored in the memory 210 may cause the processor 200 to receive a sequence of first reflected waves generated by reflection of the sequence of the first directional beams from the object through the antenna array 230 and transmit a sequence of second directional beams having a second beam width smaller than the first beam width in order to scan a second region, which is included in the first area and has a second area smaller than the first area, through the antenna array 230 on the basis of at least a portion of the received sequence of the first reflected waves. The instructions stored in the memory 210 may cause the processor 200 to receive the sequence of the second reflected waves generated by reflection of the sequence of the second directional beams from the object through the antenna array 230 and authenticate the object on the basis of at least a portion of the sequence of the second reflected waves.

According to certain embodiments, the memory 210 may store at least one template generated by learning. For example, the template may include at least one template among a template for identifying presence of the object, a template for determining liveness (the likelihood that the object is part of a human body) of the object, or a template for authenticating the object. According to certain embodiments, the memory 210 may store information on the location (for example, coordinates of the region for scanning for the object) for presence, liveness, and/or object authentication in the image of the identified object.

The processor 200 (for example, the processor 120 of FIG. 1) may be located within the housing and may be operatively connected to the wireless communication module 220, the antenna array 230 and the display 240. By the instructions stored in the memory 210, the processor 200 may transmit the sequence of the first directional beams (hereinafter, referred to as a first beam) having the first beam width for determining a distance and a range of the object located in a scan region, determine and transmit the sequence of the second directional beams (hereinafter, referred to as a second beam) having the second beam width in accordance with the distance and the range determined on the basis of the reflected wave of the first beam, acquire object information (3D depth information) on the basis of the reflected wave of the second beam, and match the acquired object information with the template of the memory 210 so as to authenticate the object.

According to certain embodiments, the electronic device 101 may determine a range for estimating depth information of a subject which is the object to be authenticated. The electronic device 101 may use a depth sensor capable of estimating depth information of the object in order to authenticate the object. The depth sensor may be a device (for example, a millimeter-wave device) including the antenna array 230 and the wireless communication module 220. For example, the millimeter-wave device may transmit a wireless signal for estimating depth information, corresponding to each pixel acquired through an image sensor of the camera, to the object and receive a signal reflected from the object. The millimeter-wave device may estimate a distance between the electronic device 101 and the object on the basis of a Time-of-Flight (TOF) value of the beam. The electronic device 101 may calculate a range of the object in order to limit the range of beamforming as much as possible and control a direction of the beam according to the distance between the object and the electronic device 101. The electronic device 101 may transmit the first beam for calculating the distance from the object in the first direction in which the object is located and the range of the object, determine the second beam for precisely scanning for the object on the basis of the range and the distance determined according to the first beam, transmit the determined second beam in the second direction in which the object is located, and receive a reflected signal including object information according to reflection of the second beam.

Figure 3A:
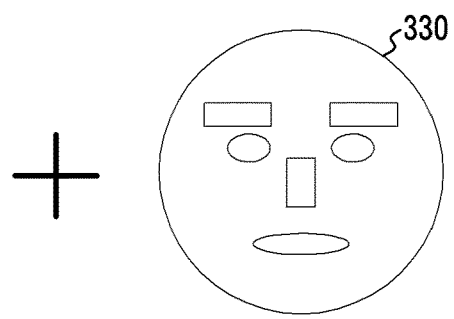
FIG. 3A and FIG. 3B illustrate a method by which an electronic device determines first beams and second beams according to certain embodiments.
Figure 3A:
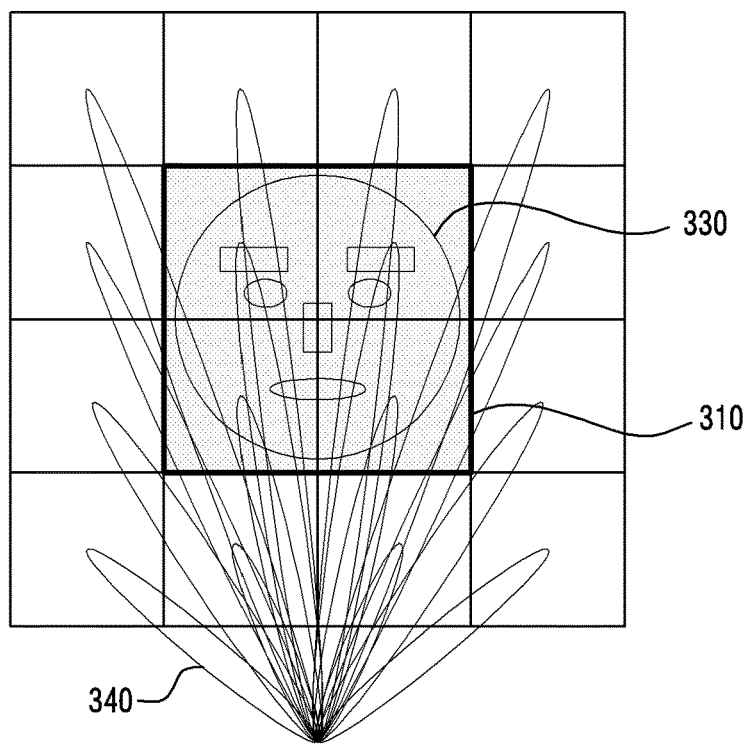
Figure 3B:
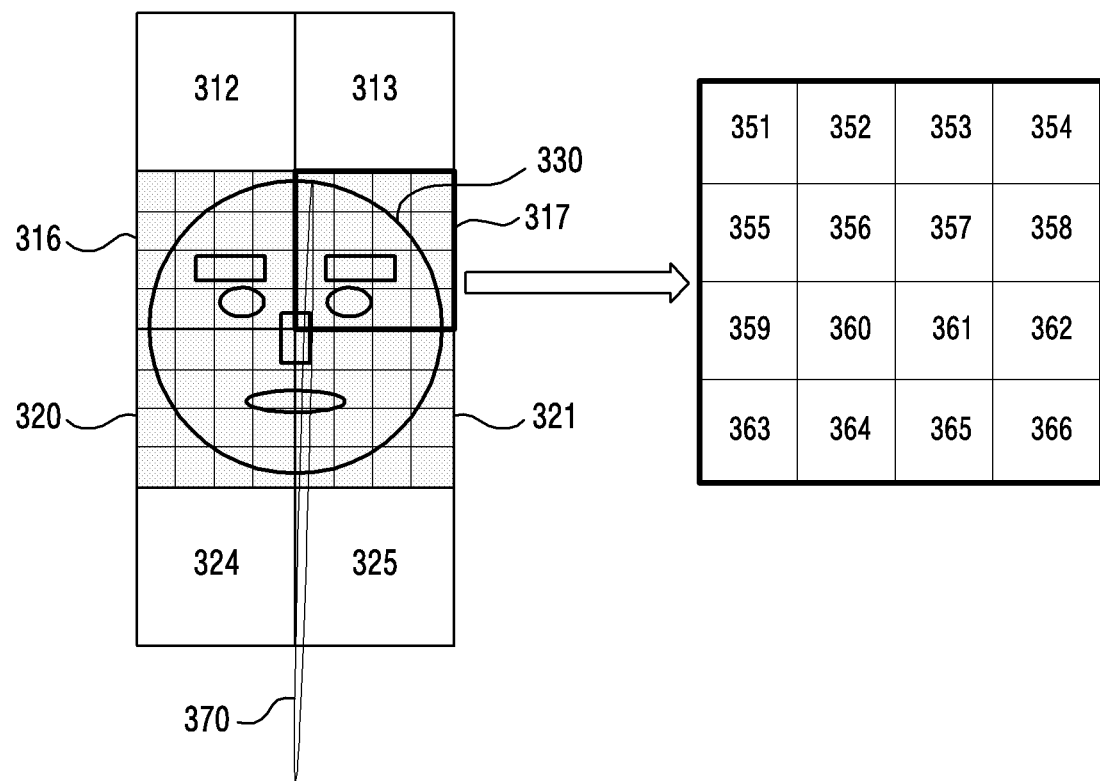

FIGS. 3A and 3B illustrate a method by which the electronic device (for example, the electronic device 101 of FIG. 1) determines a first beam and a second beam according to certain embodiments.

According to certain embodiments, the electronic device 101 may transmit a beam to a scan region in which an object exists through the millimeter-wave device and receive a signal reflected from the object in the scan region so as to extract depth information, and may authenticate the object on the basis of the extracted depth information. The scan region may be in a first direction of the electronic device (for example, the direction that the camera is pointing) and may be a region including an object. For example, the scan region may be a region in which an image from an object within a view angle of the image sensor of the camera can be acquired. In certain embodiments, the first beams can be used to determine with higher granularity the distance of an object, while the second beams determine the distance of features on the object with finer granularity and higher resolution (such as, by having narrower beams). The electronic device 101 may determine a distance from the object and a range of the object through the first beam, form a second beam in accordance with the distance and the range determined using the reflected signal of the first beam (first reflected wave) reflected from the object, transmit the second beam in the direction of the object, and acquire object information (3D-depth information) on the basis of the reflected signal of the second beam (second reflected wave) reflected from the object.

Referring to FIG. 3A, according to certain embodiments, the electronic device 101 may split a scan region 300 into a plurality of first regions (m*n regions) having a first area (size) and generate first beams 340 having a first beam width in order to scan the m*n split first regions. In certain embodiments, the scan region 300 can comprise a rectangular area located a certain distance from the electronic device and substantially (or within 3 degrees) parallel to the display. For example, the distance from the display can be 1 foot/30 cm (an average distance of the users face from the display when using the electronic device).

FIG. 3A illustrates an example of splitting of the scan region 300 into 16 (m=4, n=4) first regions 311 to 326. For example, the scan region 300 may include 16 first regions 311 to 326 having the same size (area). An object 330 may be located inside the scan region 300 (located inside may include that the scan region 300 "splices" the object). FIG. 3A illustrates an example in which the object 330 is located at the center of the scan region 300. For example, the scan region 300 may include a plurality of first regions 311 to 315, 318, 319, and 322 to 326 in which the object 330 does not exist and at least one first region, the contiguous region formed by regions 316, 317, 320, and 321 in which the object 330 exists.

The electronic device 101 according to certain embodiments may transmit the first beams 340 to the set location of the first region (for example, the central location) corresponding to each thereof by controlling an azimuth and elevation of one or more first beams 340. The electronic device 101 may transmit the first beams 340 to the first regions 311 to 326 of the scan region 300 sequentially or on the basis of the set order by controlling the azimuth and the elevation of the first beams 340. According to an embodiment, the first beams 340 transmitted to the first regions 311 to 326 may be sized such that the first beams 340 can be applied to the entire first regions. According to an embodiment, the first beams 340 transmitted to the first regions 311 to 326 may be sized such that the first beams 340 can be applied to a portion of the corresponding first regions. When the first beams 340 are sized such that the first beams 340 can be applied to the portion of the corresponding first regions, the first beams 340 may be transmitted to the central location or the set location of the corresponding first regions.

The electronic device 101 according to certain embodiments may recognize or detect the object 330 by receiving the reflected wave signals of the first beams 340 reflected from the first regions 311 to 326 of the scan region 300. For example, the first beams 340 may be transmitted to one of the first region 311, in which the object 330 does not exist, and may be transmitted to the another one of the first region 316, in which the object 330 exists. The electronic device 101 may not receive the reflected wave signal of the first beam 340 reflected from the first region 311 or may receive a reflected wave having no set value. The electronic device 101 may receive the reflected wave signal of the first beam 340 reflected from the first region 316 and recognize the presence of the object 330 on the basis of the received reflected wave signal.

The electronic device 101 may identify the presence of the object in the first region on the basis of the first reflected wave signal reflected from the object 330 through the antenna array 230. For example, no reflected waves reflected from the first regions 311 to 315, 318, 319, and 322 to 326 are received because the object does not exist. There are reflected waves from the first regions 316, 317, 320, and 321 may have different time of flight (TOF) values. For example, the first reflected wave of the first beam 340 reflected from the first region 311 may not have a set TOF value, but the first reflected wave of the first beam 340 reflected from the first region 316 may satisfy the set TOF value. The electronic device 101 may estimate the first regions (for example, the regions 316, 317, 320, or 321) which meet the set TOF value as regions in which the object 330 exists on the basis of the first beams 340 and the first reflected waves.

Referring to FIG. 3B, the electronic device 101 may perform a precise scan operation on the first regions (for example, the first regions 316, 317, 320, and 321 of FIG. 3A) including the object 330, but not the first regions (for example, the first regions 311 to 315, 318, 319, and 322 to 326 of FIG. 3A), which are not included in the object region 310, in the scan region 300. The electronic device 101 may split the first regions 316, 317, 320, and 321, in which the object 300 exists, into a plurality of second regions (M*N regions) having a second area smaller than the first area and generate second beams 370 having a second beam width smaller than the first beam width in order to precisely scan each of the M*N second regions. FIG. 3B illustrates an example of splitting the first regions in which the object exists into 16 (M=4, N=4) second regions 351 to 366. For example, in order to precisely scan the first regions 316, 317, 320, and 321 in which the object 330 exists, the electronic device 101 may split each of the first regions into second regions 351 to 366 having a smaller size than each of the first regions.

The electronic device 101 may transmit the second beams to the second regions 351 to 366 sequentially or on the basis of a set order by controlling an azimuth and elevation of the second beams. The beam width of the second beams may have a range smaller than the beam width of the first beams. FIG. 3B illustrates an example in which the second beam 370 is applied to the second region 351. According to an embodiment, the second beams transmitted to the second regions 351 to 366 may be sized such that the second beams can be applied to the entire area of the second regions. According to an embodiment, the second beams transmitted to the second regions 351 to 366 may be sized such that the second beams can be applied to a portion of the second region (for example, the region 351). When the second beams 370 are sized so as to be capable of being applied to the portion of the second region (for example, the region 351), the second beams 370 may be transmitted to the central location or the set location of the second region (for example, the region 351).

In certain embodiments, the distances of the objection from the device in each of the second regions 351 to 366 inside the first regions 316, 317, 320, and 321. The collection of distances can substantially be used to determine what the object 330 is, such as a user's face.

The electronic device 101 according to certain embodiments may authenticate the object 330 by receiving reflected wave signals of the second beams 370 reflected from the second regions 351 to 366 of the first region (for example, the first region 316, 317, 320, or 321) in which the object 330 exists.

According to certain embodiments, the first beams may use beams having a relatively wider beam width than the second beams, and the second beams may acquire detailed object information (high-resolution object information) using beams having a narrow beam width. According to an embodiment, in order to reduce the time spent estimating the range of the object, the electronic device 101 may first estimate the range of the object by transmitting the first beams having the wider beam width to the first regions 311 to 326 of the scan region 300. The electronic device 101 may estimate the first regions 316, 317, 320, and 321 in which the object exists on the basis of the first reflected waves. In order to acquire information of high resolution in the first regions 316, 317, 320, and 321 in which the existence of the object is estimated, the electronic device 101 may receive the second reflected waves by transmitting the second beams, having the narrower beam width, to the second regions 351 to 366 corresponding to the first region (for example, the region 317) as illustrated in FIG. 3B. The electronic device 101 may authenticate the object on the basis of the second reflected high-resolution waves.

According to certain embodiments, the electronic device 101 may reduce a beam-processing time by transmitting the second beams only to selected first regions (for example, at least one of the first regions 316, 317, 320, and 321 of FIG. 3B) in which the object exists in the scan region 300 and secure the reflected high-resolution signals by precisely making beams for the regions in which the object exists.

FIGS. 4A to 4E illustrates a method by which the electronic device (for example, the electronic device 101 of FIG. 1) determines beams according to certain embodiments.

Figure 4A:
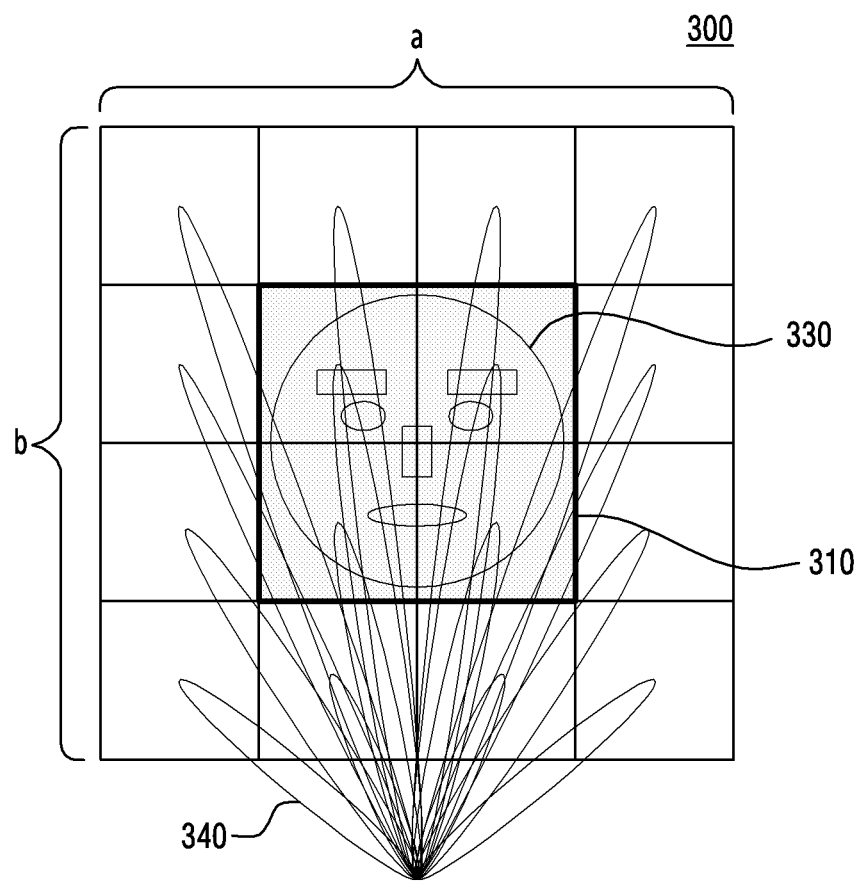
FIG. 4A, FIG. 4B, FIG. 4C, FIG. 4D, and FIG. 4E illustrate a method by which an electronic device determines beams according to certain embodiments.

FIG. 4A illustrates an example in which the electronic device 101 determines the distance from the object and the range of the object through first beams. Referring to FIG. 4A, the electronic device 101 may determine the scan region 300 for identifying the object 330. For example, the scan region 300 may be a view angle of the camera. The electronic device 101 may separate the scan region 300 into first regions having a first area (for example, the first regions 311 to 326 of FIG. 3A) and transmit the first beams 340 for estimating the distance from the object and the range thereof to the split first regions 311 to 326. When the electronic device 101 detects the location of the object in the scan region 300 on the basis of the second beams, having the narrower beam width, for authenticating the object, it may take a long time. When the location of the object 330 cannot be known, the electronic device 101 may split the scan region 300 into larger regions to identify the location of the object 330, and may precisely scan the regions 310, in which the location of the object 330 is identified, in order to authenticate the object. For example, in order to rapidly detect the object, the electronic device 101 may split the scan region 300 into predetermined areas (for example, first areas (for example, the first regions 311 to 326 of FIG. 3A), transmit beams having a wider beam width (for example, the first beams 340) to the first regions through beamforming, and estimate the regions 310 in which the object 330 exists on the basis of the signals reflected from the first regions. The electronic device 101 may authenticate the object 330 by precisely scanning the regions 310 in which the object exists.

FIG. 4A illustrates an example in which the scan region 300 is split into 16 first regions. As illustrated in FIG. 4A, a user's face corresponding to the object 330 may be located in a part of the scan region 300. For example, the scan region 300 may be a view angle (an area of a*b) of the camera. Here, a may be the horizontal size of the screen and b may be the vertical size of the screen. The electronic device 101 may transmit the first beams 340 to the first regions (for example, the first regions 311 to 326 of FIG. 3) and identify the object location region 310 (for example, the first regions 316, 317, 320, and 321 of FIGS. 3A and 3B) in which the object 330 exists through the signals reflected from the first regions 311 to 326. The object location region 310 may include at least one first region (for example, the first regions 316, 317, 320, and 321) of FIGS. 3A and 3B). According to an embodiment, the electronic device 101 may transmit the first beams 340 to the 16 first regions 311 to 326 according to a set order and receive reflected waves of the first beams 340 reflected from the 16 first regions 311 to 326. The electronic device 101 may estimate the object location region 310 on the basis of reflected wave information (for example, TOF, phase, and amplitude). For example, a reflected wave reception time (for example, TOF) of the object location region 310 may be shorter than a reflected reception time of a region in which the object does not exist. The object location region 310 may be estimated as at least one first region value.

According to certain embodiments, the electronic device 101 may rapidly find the range of the target by controlling the size of the first beams 340 and transmitting the controlled first beams to larger regions. For example, although FIG. 4A illustrates the transmission of beams to a total of 16 sections, the beams may be changed to be larger and transmitted to 8 sections generated by grouping the 16 sections by 2. Such an operation may be repeated several times with no limit on the number of times. When transmission is performed according to IEEE 802.11ad, the electronic device 101 may transmit the first beams 340 one at a time and thus repeat the transmission a total of 16 times. When the number of antenna array sets is 2 or more, the electronic device 101 may simultaneously calculate reflected signals by splitting the regions into first regions. According to an embodiment, the electronic device 101 may use a transmission frequency band of several GHz or higher (for example, 3.1 GHz to 10.6 GHz) and transmit beams through an Ultra-Wide Band (UWB) providing a speed of 100 Mbps or faster. According to certain embodiments, the electronic device 101 may perform object authentication using another protocol that may support beamforming other than IEEE 802.11ad or UWB and receive reflected waves generated by reflection of beams from the object.

Figure 4B:
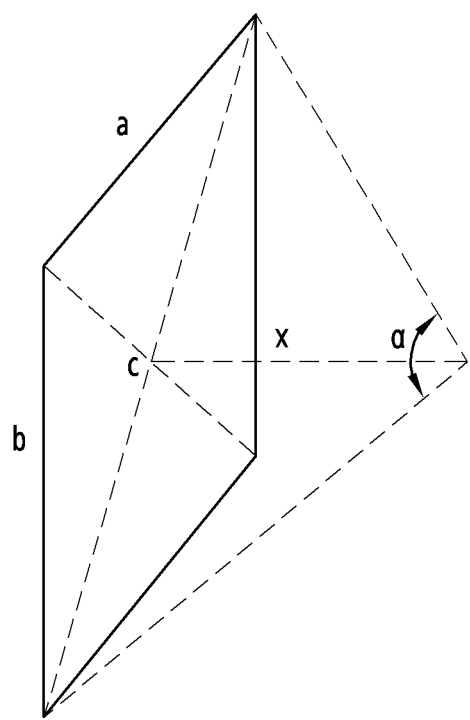
Figure 4C:
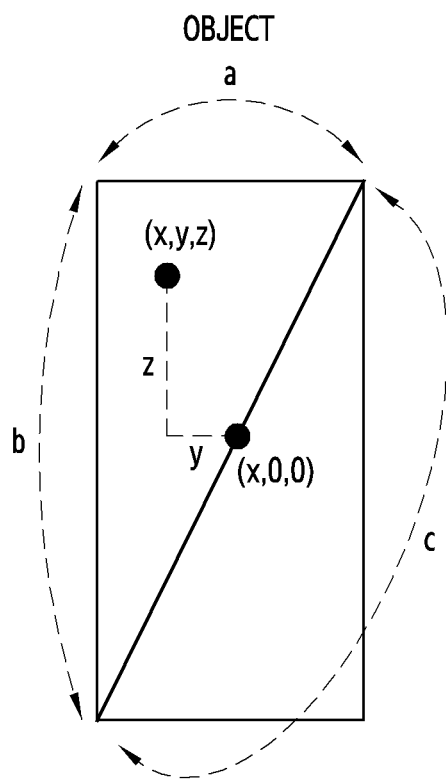
Figure 4D:
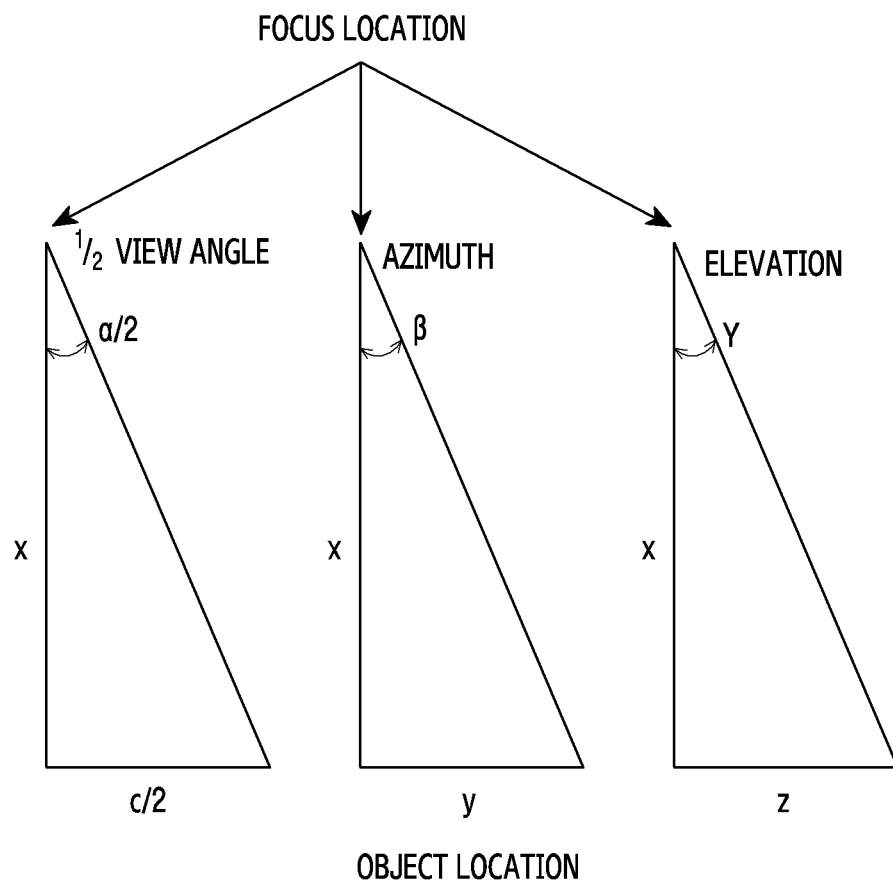

FIG. 4B illustrates the relationship between an aspect ratio and a view angle, and FIGS. 4C and 4D illustrate a method of determining an azimuth and elevation of a specific point on the basis of the aspect ratio and the view angle.

According to certain embodiments, in order to transmit beams to split regions (for example, first regions or second regions) through the millimeter-wave device, the electronic device 101 may control an angle of the beams. The electronic device 101 may use the aspect ratio and the view angle of the camera in order to control the angle of the beams. In FIG. 4B, a and b may indicate ratios of the width and the length of the screen, c may indicate a diagonal length of the screen, and a may be a view angle of the camera. The view angle of the camera may be an angle at a diagonal corner, and the electronic device 101 may calculate a camera angle in a direction of line a and a camera angle in a direction of line b on the basis of the view angle. The distance from the object cannot be initially known, and therefore the view angle may be calculated on the basis of a maximum view angle of the camera.

When the object is mapped at the distance of x from the electronic device 101 with the view angle α, the central point of the object may be (x, 0, 0), as illustrated in FIG. 4C. x may be expressed as Equation (1), and an azimuth β and an elevation γ of a specific point (x, y, z) may be calculated as Equation (2).

$$x = \frac{c}{2\tan\frac{\alpha}{2}} = \frac{\sqrt{a^2 + b^2}}{2\tan\frac{\alpha}{2}}$$ Equation (1)

$$\beta = \tan^{-1}\frac{y}{x} = \tan^{-1}\frac{2y\tan\frac{\alpha}{2}}{\sqrt{a^2 + b^2}}$$ Equation (2)

$$\gamma = \tan^{-1}\frac{z}{x} = \tan^{-1}\frac{2z\tan\frac{\alpha}{2}}{\sqrt{a^2 + b^2}}$$

According to certain embodiments, as illustrated in FIG. 4D, the electronic device 101 may calculate an azimuth β (a horizontal angle) corresponding to a specific point (y, z) and an elevation γ (vertical angle) with respect to the camera aspect ratio a and b and the camera view angle α as shown in Equation (2). When a region for scanning for an object is split into a specific number of first regions and a point (y, z) to which the first beam is transmitted to each of the first regions is calculated, the electronic device 101 calculates as many angles β and γ of the beams as the number of regions and transmit the beams in directions according to the sections. For example, when the scan region is split into 16 sections as illustrated in FIG. 4A, the first regions may be split as shown in [Table 1].

TABLE 1

| 1 | 2 | 3 | 4 |
|---|---|---|---|
| 5 | 6 | 7 | 8 |
| 9 | 10 | 11 | 12 |
| 13 | 14 | 15 | 16 |

The electronic device 101 may perform beamforming for each of first regions corresponding to 16 sections by calculating the angles β and γ of the beams for the first regions as shown in Equation (2). For example, when it is assumed that the aspect ratio is 16:9 and the view angle is 90 degrees, a range of transmission angles of the beams for the first regions corresponding to the first sections may be calculated. The range of the first sections may be (−8, 4.5) to (−4, 2.25) calculated through Cartesian coordinates and the azimuth and the elevation may be calculated as (−41°~−23°, 13°~26°) through Equation (2). According to certain embodiments, when the distances between the camera and the antenna array of the electronic device 101 and the millimeter-wave device are different, calculation may be performed after movement by a distance corresponding to the difference from (0,0). For example, when the beam transmission location is (y1, z1) (when it is assumed that the camera location is (0, 0) and the RF location is (y1, z1) in order to compensate for the difference between the RF location and the camera location), the electronic device 101 may calculate the azimuth β and the elevation γ as shown in Equation (3) below.

$$\beta = \tan^{-1}\frac{y}{x} = \tan^{-1}\frac{2(y - y_1)\tan\frac{\alpha}{2}}{\sqrt{a^2 + b^2}}$$ Equation (3)

$$\gamma = \tan^{-1}\frac{z}{x} = \tan^{-1}\frac{2(z - z_1)\tan\frac{\alpha}{2}}{\sqrt{a^2 + b^2}}$$

According to certain embodiments, the electronic device 101 may control and transmit the first beam width on the basis of an object type. For example, the electronic device 101 may identify the object type on the basis of information input from the user or the camera. For example, when the object types is a landscape, a thin and long first beam may be transmitted. When the object type is face authentication, the electronic device may predict a distance to the face of the typical user and control the width of the first beam transmitted to each first region. When the part of the face is measured through the above method, the electronic device 101 may estimate the distance to the face on the basis of a time value of regions in which reflected signals are received. The electronic device 101 may form first beams to be transmitted far away and make the width of the first beams inversely proportional to the distance according to the object type. For example, when an out-focus function of the electronic device 101 is activated when a picture or a video is captured, the electronic device 101 may form first beams to be transmitted far away and determine a parameter value related to out-focus on the basis of a TOF value of the received reflected signals of the first beams. For example, when the electronic device 101 receives, from the camera, input values having different resolutions for a face region and a landscape region when a picture or a video is captured, the electronic device 101 may apply different beams to the face region and the landscape region, and may measure information requested by the camera (for example, TOF of each of split regions) and transfer the result to another module.

Figure 4E:
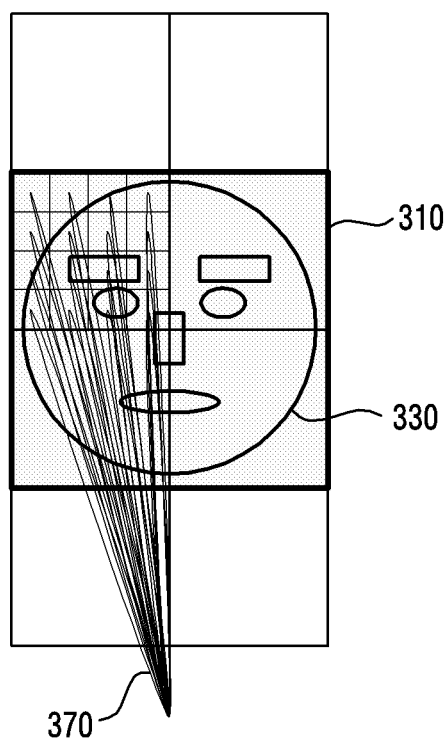

FIG. 4E illustrates an example in which the electronic device 101 acquires object information through second beams according to certain embodiments.

Referring to FIG. 4E, the electronic device 101 according to certain embodiments splits each of first regions in a region 310 (four first regions) in which the object 330 exists into 16 second regions. The electronic device 101 may further split the regions in which the object 330 exists and transmit second beams 370 to each of the split second regions 351 to 366 so as to acquire more accurate beam-reflected signals. Azimuths and elevations of the second beams 370 may be calculated using Equation (2).

According to certain embodiments, the electronic device 101 may acquire object information on the basis of reflected waves of the second beams 370. The reflected signals of the second beams 370 may include object information (for example, depth information). The reflected signals of the second beams 370 may be reflected signals from the object, to which the beams are transmitted, in specific regions rather than information on pixels. For example, a bandwidth in a beamforming scheme of IEEE 802.11ad 60 GHz may be about 3 to 3.56 GHz, and a resolution that can be measured for reflection of the second beams 370 may be about 100 µm. Accordingly, reflected signals for the very short distance of about 100 µm may be transmitted to specific regions and measured. For example, when the liveness of a user's face is to be determined or when security is needed, the electronic device 101 may increase the resolution. When only identification of the object is needed, the electronic device 101 may decrease the resolution.

According to an embodiment, the electronic device 101 may transmit beams through an Ultra-Wide Band (UWB) and receive reflected waves so as to acquire object information. The UWB may use a transmission frequency band higher than or equal to several GHz (for example, 3.1 GHz to 10.6 GHz) and provide a speed faster than or equal to 100 Mbps.

Figure 5:
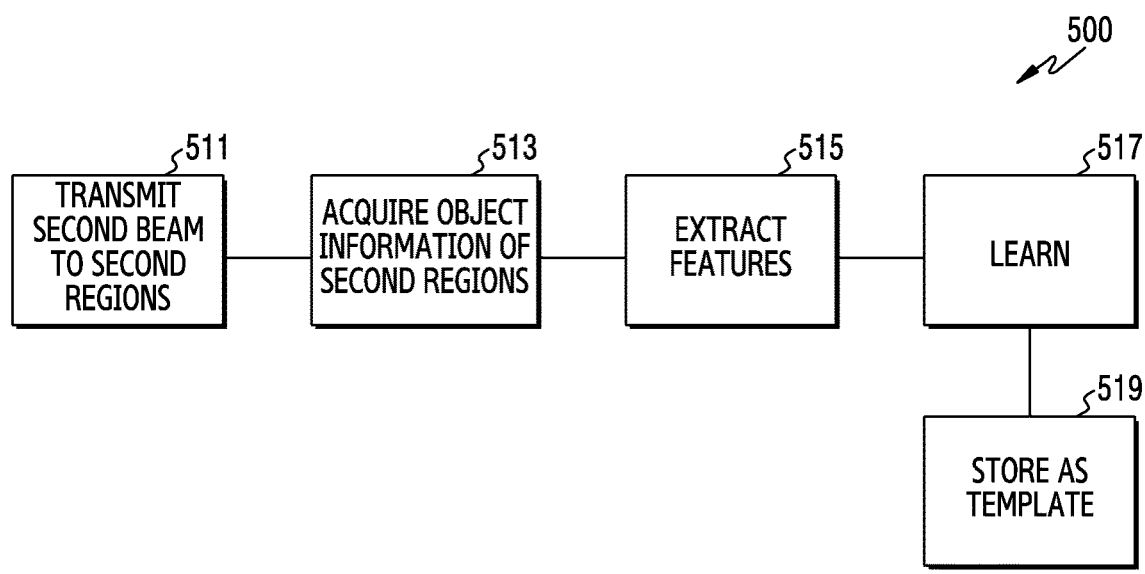
FIG. 5 illustrates an operation in which an electronic device determines acquired object information as templates through machine learning according to certain embodiments.

FIG. 5 is a flowchart 500 illustrating operations in which an electronic device (for example, the electronic device 101 of FIG. 1) determines acquired object information as templates through machine learning. In certain embodiments, the flowchart 500 can be performed when the user initializes the electronic device, such as during first or early usage.

According to certain embodiments, the electronic device 101 may estimate regions in which the object exists, learn beams including object information in the object estimation regions through machine learning, and store the result of learning in a memory (for example, the memory 130 of FIG. 1) as templates. The electronic device 101 may generate and store templates (comparative data) for object authentication. In order to register the templates, the electronic device 101 may place the object (for example, the subject) at a predetermined distance (for example, 20 cm, 25 cm, or 30 cm), collect data, and perform machine learning on the basis of the collected data. For example, when the object is a person (for example, a face), the user may perform an authentication operation at a location spaced apart from the electronic device 101 by a predetermined distance. The electronic device 101 may collect user face information according to each distance, learn the data collected at the corresponding distance on the basis of a machine-learning scheme, and then register the result as templates. Thereafter, for example, when the user is located at a distance of 21 cm/8.4 in, the electronic device 101 may additionally identify whether to perform authentication on the basis of machine learning and update the corresponding information as templates (comparative data).

FIG. 5 illustrates an operation in which the electronic device 101 recognizes an object spaced a distance apart therefrom and registers the object as a template.

According to certain embodiments, the electronic device 101 may transmit second beams to second regions of first regions, predicted to be regions in which the object exists, in operation 511. For example, the second regions may be portions of the first regions which are regions in which an image is capable of being acquired by an image sensor of the camera module (for example, the camera module 180 of FIG. 1). The electronic device 101 may receive second reflected waves reflected from the object in the second regions and acquire object information on the basis of the received second reflected waves in operation 513. The electronic device 101 may extract and compare feature points (feature extraction and matching) in operation 515. The electronic device 101 may learn and update the compared feature points in operation 517 and store the updated feature points (feature vectors) as templates in operation 519.

According to certain embodiments, the electronic device 101 may determine a template for authenticating the object by learning feature points based on the received second reflected waves generated by reflection of the second beams from the object. For example, the electronic device 101 may generate a template for authenticating the object on the basis of all or some of TOF, phase, and amplitudes based on the second reflected waves. The electronic device 101 may learn a template for identifying the presence of the object, a template for determining liveness of the object, and/or a template for authenticating the object. For example, the template for identifying the presence and the template for determining liveness may be generated on the basis of the first reflected waves of the first beams, and the template for authenticating the object may be generated on the basis of the second reflected waves of the second beams.

According to certain embodiments, the electronic device 101 or an external server may generate templates based on the first reflected waves and the second reflected waves through deep learning (or a deep neural network or an artificial neural network). For example, a deep-learning method may use a Convolutional Neural Network (CNN) scheme. When learning is performed through the CNN scheme, learning is performed by inputting object information, to be learned, into the CNN and features based on the learning result may be extracted and stored as templates. For example, when the object is a user's face, information on specific parts that can be feature points of the face, such as at least one of the eye, the nose, and the mouth, actually acquired from the user's face, and information on each specific part received by the wireless communication module (for example, phase, TOF, and amplitude values acquired from reflected waves of beams of 60 GHz) may be input into the CNN, and an output value corresponding thereto may be determined to be true. Further, the same parameters of typical users may be input, and an output value corresponding thereto may be determined as false. In the learning method using the CNN, the above calculation may be repeatedly performed a set number of times, and an error generated during the calculation process may be updated (through a backpropagation scheme) and a model (template) for making the user parameter true may be generated and stored in the memory. The template may include a presence template, a liveness template, and/or a face authentication template. The presence template and the liveness template may be used for all users, and the face authentication template may be a unique template generated by learning of each user image and reflected waves.

The method may be trained through transfer learning, in which models are configured in advance using parameters of typical users and fine tuning is performed using parameter values of new users.

The electronic device 101 may perform face authentication by comparing information of reflected waves of the face received during execution of a face authentication application with corresponding information stored in the memory. When actual authentication is performed using trained models, the electronic device 101 may perform an authentication operation having parameter values based on reflected waves received in real time as inputs into the CNN. The electronic device 101 may authenticate the user as a legitimate user when the output of the CNN is true and determine that the user is not a legitimate user when the output is false.

Figure 6:
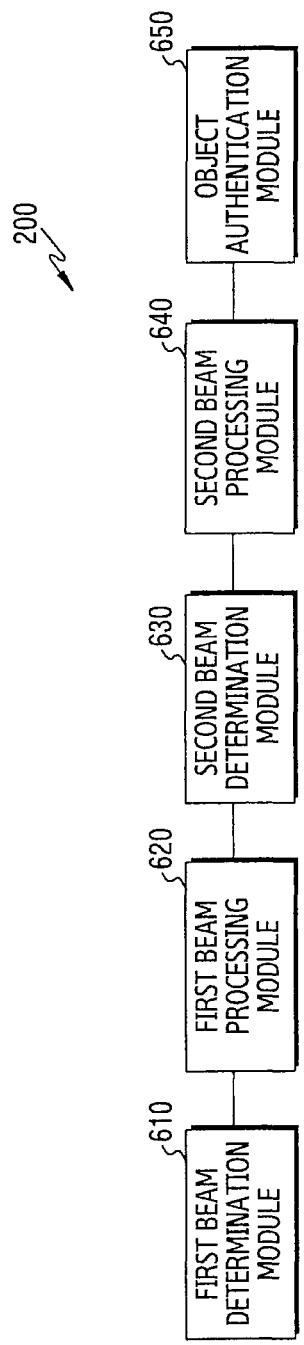
FIG. 6 illustrates the configuration of an electronic device according to certain embodiments.

FIG. 6 illustrates the configuration of an electronic device (for example, the electronic device 101 of FIG. 1).

Referring to FIG. 6, the electronic device 101 may include a first beam determination module 610, a first beam-processing module 620, a second beam determination module 630, a second beam-processing module 640, and an object authentication module 650. The configuration in FIG. 6 may be the configuration of the processor (for example, the processor 120 of FIG. 1 or the processor 200 of FIG. 2).

The first beam determination module 610 may determine first beams for calculating a distance between the object and the electronic device 101 and/or a range of the object. The first beam determination module 610 may split a scan region into regions having a set area and determine first beams to be transmitted to the split regions in order to rapidly detect the object. The scan region may be a region including the object to be authenticated. For example, the scan region may be a region in which an image can be acquired by an image sensor of the camera module (for example, the camera module 180 of FIG. 1). The first beam determination module 610 may split the scan region into a plurality of first regions having a first area and calculate directivity of the first beams to be transmitted to the split first regions. The directivity of the first beams may be calculated using Equation (2) or Equation (3) on the basis of coordinate information of the corresponding first regions.

The first beam-processing module 620 may perform control to output a sequence of the determined first beams through a wireless communication module (for example, the wireless communication module 220 of FIG. 2). The wireless communication module 220 and the antenna array (for example, the antenna array 230 of FIG. 2) may transmit the sequence of the first beams to the corresponding first regions. For example, the sequence of the first beams may be beamformed to be transmitted to the central location of the corresponding first regions. The first beam-processing module 620 may receive a sequence of the first reflected waves generated by reflection of the sequence of the first beams from the first regions through the wireless communication module 220. The first beam-processing module 620 may identify object information of the first regions on the basis of the received sequence of the first reflected waves. The first reflected waves may include information on TOF, phase, and amplitude of the corresponding first regions. The first beam-processing module 620 may identify whether the object is located in the corresponding first regions on the basis of first reflected wave information. For example, when first reflected waves are received within a set reference time through calculation of TOF from the first reflected waves, the first beam-processing module 620 may determine that the object is located in the corresponding first regions. The first beam-processing module 220 may determine whether the object is located in the corresponding first regions by scanning for the first regions of the scan region.

The second beam determination module 630 may determine a sequence of second beams to be transmitted to the first regions which are determined as regions in which the object exists. The second beam determination module 630 may split the first regions in which the object exists into second regions having a second area smaller than the first area and determine the directivity of the second beams to be transmitted to the split second regions. The second beams may have a beam width narrower than the beam width of the first beams. The directivity of the second beams may be calculated using Equation (2) or Equation (3) on the basis of coordinate information of the corresponding second regions. According to an embodiment, the second beam determination module 630 may split at least one first region including the object and having the first area into second regions having the second area. For example, when the first regions are split into 16 second regions and it is determined that the object is located in four first regions by the first beams, the second beam determination module 640 may determine 16*4 second beams.

The second beam-processing module 640 may perform control to output the sequence of the determined second beams through the wireless communication module 220. The wireless communication module 220 and the antenna array 230 may transmit the sequence of the second beams to corresponding second regions. For example, the sequence of the second beams may be beamformed to be transmitted to the central location of the corresponding second regions. The second beam-processing module 640 may receive a sequence of second reflected waves reflected from the corresponding second regions through the wireless communication module 220. The second beam-processing module 640 may identify object information of the second regions on the basis of the received sequence of the second reflected waves. The second reflected waves may include information on a TOF, phase, and amplitude of the corresponding second regions. The second beam-processing module 620 may acquire information on the object located in the corresponding second regions on the basis of second reflected wave information.

The object authentication module 650 may authenticate the object by performing machine learning on the object information acquired by the second beam-processing module 640. The object authentication module 650 may authenticate the object on the basis of machine learning for matching the object authentication template stored in the memory (for example, the memory 210 of FIG. 2) with the acquired object information.

An electronic device (for example, the electronic device 101 of FIG. 1) according to certain embodiments may include a housing comprising a first plate facing a first direction, a second plate facing a direction opposite the direction faced by the first plate, and a side member surrounding a space between the first plate and the second plate, a display 240 exposed through a first part of the first plate, an antenna array 230 disposed within the housing and/or on a portion of the housing, a wireless communication module 220 electrically connected to the antenna array 230 and configured to form directional beams through the antenna array 230; a processor 200 located within the housing and operatively connected to the display 240 and the wireless communication module 240; and a memory 210 operatively connected to the processor 200. The memory 210 may store instructions causing the processor 200 to, when executed, transmit a sequence of first directional beams having a first beam width to scan first regions having a first area outside the housing through the antenna array 230, receive a sequence of first reflected waves generated by reflection of the sequence of the first directional beams from an object through the antenna array 230, transmit a sequence of second directional beams having a second beam width narrower than the first beam width to scan second regions, which are included in the first regions and have a second area smaller than the first area, through the antenna array 230 based on at least a portion of the received sequence of the first reflected waves, receive a sequence of second reflected waves generated by reflection of the sequence of the second directional beams from the object through the antenna array 230, and authenticate the object based on at least a portion of the sequence of the second reflected waves.

According to certain embodiments, the instructions may cause the processor 200 to activate the antennas selected from the antenna array 230 in order to determine the first beam width and/or the second beam width.

According to certain embodiments, the instructions may cause the processor 200 to determine a relative distance and/or a direction between the object and the electronic device 101 based on the sequence of the first reflected waves.

According to certain embodiments, the electronic device 101 may further include an image sensor exposed through a part of the first plate and disposed to face the first direction, and the instructions may cause the processor to include the first regions in a view angle of the image sensor.

According to certain embodiments, the object may include a user's face.

In certain embodiments, a template for the user's face can be determined for a variety of distances. Each template can then be reduced to only a subset of the second regions 351 . . . 366 of the first regions having the object, e.g., 316, 317, 320, and 321 (shortened template). The specific second regions 351 . . . 366 can be used based on frequency of past occurrence. If the reflected wave patterns at the specific second regions have a high enough correlation to the shortened template, the object can be considered authenticated, thereby bypassing a more extensive comparison using all of the second regions.

Figure 7:
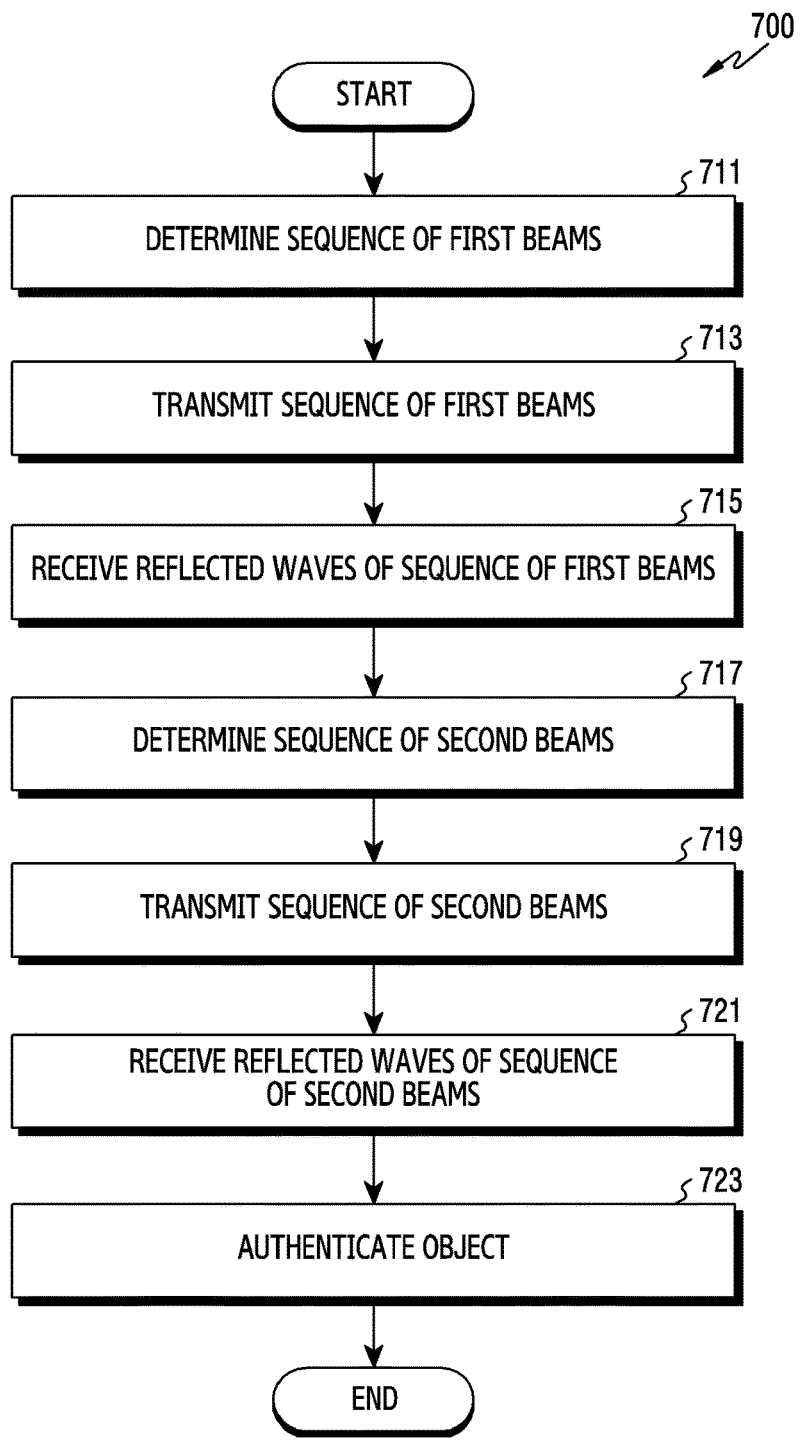
FIG. 7 is a flowchart illustrating an object authentication operation of an electronic device according to certain embodiments.

FIG. 7 is a flowchart illustrating an object authentication operation 700 of an electronic device (for example, the electronic device 101 of FIG. 1) according to certain embodiments.

Referring to FIG. 7, the electronic device 101 may guide an object (for example, a user) to be positioned within a transmission range of the first beams 340 before the object authentication operation. For example, when the object 330 is authenticated, the object 330 may not be located within the scan region 300 of the electronic device 101. The electronic device 101 may guide the object 330 to be positioned within the scan region 300 before the object authentication operation. For example, the electronic device 101 may display a guide message instructing the user to look at the camera while being spaced apart from the electronic device 101 by a predetermined distance in the form of an audio and/or video message in order to authenticate the object. In another example, when the user executes an object-authentication-related application, the electronic device 101 may display a guide instructing the user to position himself or herself within a view angle of the camera module 180 on the display 240.

When a request for performing the object authentication procedure is made, the electronic device 101 according to certain embodiments may determine first beams 340 for identifying the distance between the electronic device 101 and the object 330 and the range of the object in operation 711. The object 330 may be located in a portion of the scan region 300. The electronic device 101 may split the scan region into a plurality of first regions 311 . . . 326 having a first size and determine first beams to be transmitted to the split first regions in order to rapidly detect the object. The first beams 340 may include beams having a wide beam width and may be formed to be transmitted to the center of the first regions. According to an embodiment, the electronic device 101 may determine information on the first regions to which the first beams are transmitted on the basis of the view angle of the camera located in the front surface of the electronic device 101. The electronic device 101 may transmit the first beams 340 to the central location of the first regions through a wireless communication module (the wireless communication module 220 of FIG. 2) and an antenna array (for example, the antenna array 230 of FIG. 2) in operation 713. For example, when object authentication for the user is performed, the electronic device 101 may transmit the first beams 340 to the central location of the first regions through the wireless communication module 220 and the antenna array 230. The transmitted first beams 340 may be reflected by the object located in the first regions of the scan region 300, and no reflected wave is generated in the first regions in which the object does not exist. The electronic device 101 may receive first reflected waves reflected from the first regions through the antenna array 230 and the wireless communication module 220 in operation 715.

The electronic device 101 may identify object information in the received first reflected waves and determine the first regions 316, 317, 320, 321 in which the object exists in operation 717. In the first regions 316, 317, 320, 321 in which the object exists, it may take a short time to transmit, reflect, and receive the first beams. The electronic device 101 may identify the first regions 316, 317, 320, 321 in which the object exists and the first regions 311-315, 318, 319, 322-326 in which the object does not exist on the basis of the first reflected waves. The electronic device 101 may split the first regions in which the object exists into a plurality of second regions 351 . . . 366 having a second size and determine second beams to be transmitted to the split second regions. The second beams may have a beam width narrower than that of the first beams.

The electronic device 101 may transmit the corresponding second beams to the second regions of the first regions in which the object exists through the wireless communication module 220 and the antenna array 230 in operation 719. The electronic device may receive second reflected waves reflected from the second regions through the antenna array 230 and the wireless communication module 220 in operation 721. The electronic device 101 may acquire object information from the received second reflected waves. The electronic device 101 may perform the object authentication operation by matching the object information acquired by the second reflected waves with templates stored in a memory (for example, the memory 210 of FIG. 2) through machine learning in operation 723.

The electronic device 101 according to certain embodiments may reduce the time for estimating the range of the object (for example, the location at which the object exists) by first estimating the range of the object through the first beams having the wide beam width and may acquire high-resolution object information in the regions estimated as the object location through the second beams having the narrow beam width.

Figure 8:
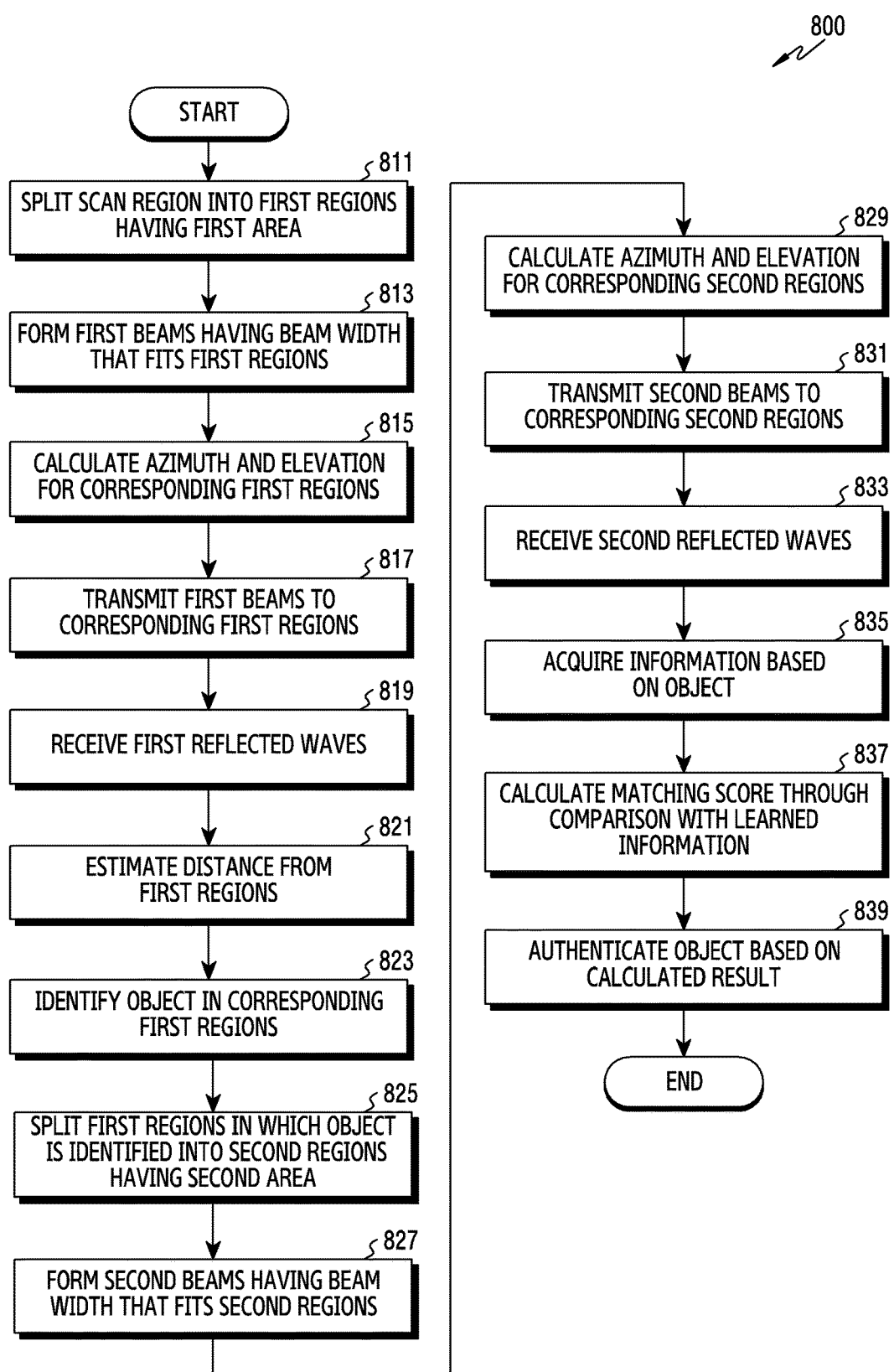
FIG. 8 illustrates a method by which an electronic device controls beams for object authentication according to certain embodiments.

FIG. 8 illustrates a method 800 by which an electronic device (for example, the electronic device 101 of FIG. 1) controls beams for object authentication according to certain embodiments.

Referring to FIG. 8, the electronic device 101 may split the scan region into a specific number of sections in operation 811. The scan region 300 is a region in which to scan for the object 330, and may include regions (e.g., first regions 316, 317, 320, 321) in which the object exists and regions (e.g., first regions 311-315, 318, 319, and 322-326) in which no object exists. For example, the scan region may be a region in which an image can be acquired on the basis of a view angle of a camera module (for example, the camera module 180 of FIG. 1). The electronic device 101 may split the scan region into a plurality of first regions 311 . . . 326 having a first size. The electronic device 101 may form first beams having a beam width that fits the first regions 311 . . . 326 in operation 813. The electronic device 101 may form first beams such that the first beams may be transmitted to a set location of the first regions 311 . . . 326 in operation 815. For example, the electronic device 101 may calculate an azimuth β and elevation γ of center coordinates of the first regions using Equation (2) or Equation (3). The electronic device 101 may perform beamforming of the first beams with the calculated azimuth and elevation through a wireless communication module (for example, the wireless communication module 220 of FIG. 2) and an antenna array (for example, the antenna array 230 of FIG. 2) in operation 817. The sequence of the beamformed first beams may be transmitted to the central location of the corresponding first regions from the antenna array 230.

The electronic device 101 may receive a sequence of reflected waves (first reflected waves) of the first beams reflected from the first regions in operation 819. For example, the sequence of the first reflected waves may be signals reflected from the central coordinate location of the first regions of the scan region. The electronic device 101 may estimate the distance from the corresponding first regions 316, 317, 320, and 321 and the range of the object 330 on the basis of the received first reflected waves in operation 821. The first reflected waves reflected from the first regions in which the object 330 exists may be received by the electronic device 101 within a specific time, and the first reflected waves reflected from the first regions in which no object, e.g., 311-315, 318, 319, and 322-326, exists may not be received by the electronic device 101 within a specific time. The electronic device 101 may estimate the distance from the object 330 on the basis of the first reflected waves reflected from the first regions (for example, through calculation of TOF of the first reflected waves). The electronic device 101 may determine first regions 316, 317, 320, and 321 in which the object exists 330 on the basis of the estimated distance in operation 823. For example, the electronic device 101 may identify that the first regions, determined to be located within a specific range on the basis of the first reflected waves, are regions in which the object exists.

The electronic device 101 may split the first regions identified as the regions in which the object exists into second regions 351 . . . 366 having a second area in operation 825. The electronic device 101 may split the corresponding first regions into smaller sections in order to precisely acquire object information of the first regions in which the object exists. The resolution of the acquired object information may be high depending on the number of second regions 351 . . . 366 into which the first region is split. The electronic device 101 may form second beams 370 having a beam width that fits the second regions 351 . . . 366 in operation 827. The second beams 370 may have a second beam width, and the second beam width may be narrower than the first beam width. The electronic device 101 may calculate an azimuth and elevation of the corresponding second regions 351 . . . 366 in operation 829. For example, the electronic device 101 may calculate an azimuth β and elevation γ for center coordinates of the second regions 351 . . . 366 or coordinates of a set location using Equation (2) or Equation (3). The electronic device 101 may perform beamforming of the second beams with the calculated azimuth and elevation through the wireless communication module 220 and the antenna array 230 in operation 831. The sequence of the beamformed second beams 370 may be transmitted to the set location of the corresponding second regions 351 . . . 366 through the antenna array 230.

The electronic device 101 may receive a sequence of reflected waves (second reflected waves) of the second beams reflected from the second regions 351 . . . 366 in operation 833. For example, the sequence of the second reflected waves may be signals reflected from the central location of the second regions 351 . . . 366 resulting from splitting of the first regions in which the object exists. The electronic device 101 may acquire object information on the basis of the received second reflected waves in operation 835. The object information acquired in the second regions 351 . . . 366 may be information on TOF, phase, and/or amplitude. The resolution of the object 330 information may be determined by the number of second regions 351 . . . 366 resulting from splitting of the first regions and the sequence of the second beams 370.

The electronic device 101 may calculate a matching score by comparing the acquired object information with learning data (a template) stored in the memory (for example, the memory 210 of FIG. 2) in operation 837. The learning data stored in the memory 210 may be data learned through machine learning and data generated by learning information on objects to be authenticated. The electronic device 101 may acquire object information from the second reflected wave information based on the second beam sequence and match the acquired object information with learning data that has been learned and stored in advance in the memory 210 so as to calculate the matching score. The electronic device 101 may perform the object authentication operation on the basis of the calculated matching score in operation 839. For example, the electronic device 101 may compare the calculated matching score with a reference value, and may determine that the object authentication succeeds (true) when the matching score is larger than the reference value and determine that the object authentication fails (false) when the matching score is smaller than the reference value.

Figure 9:
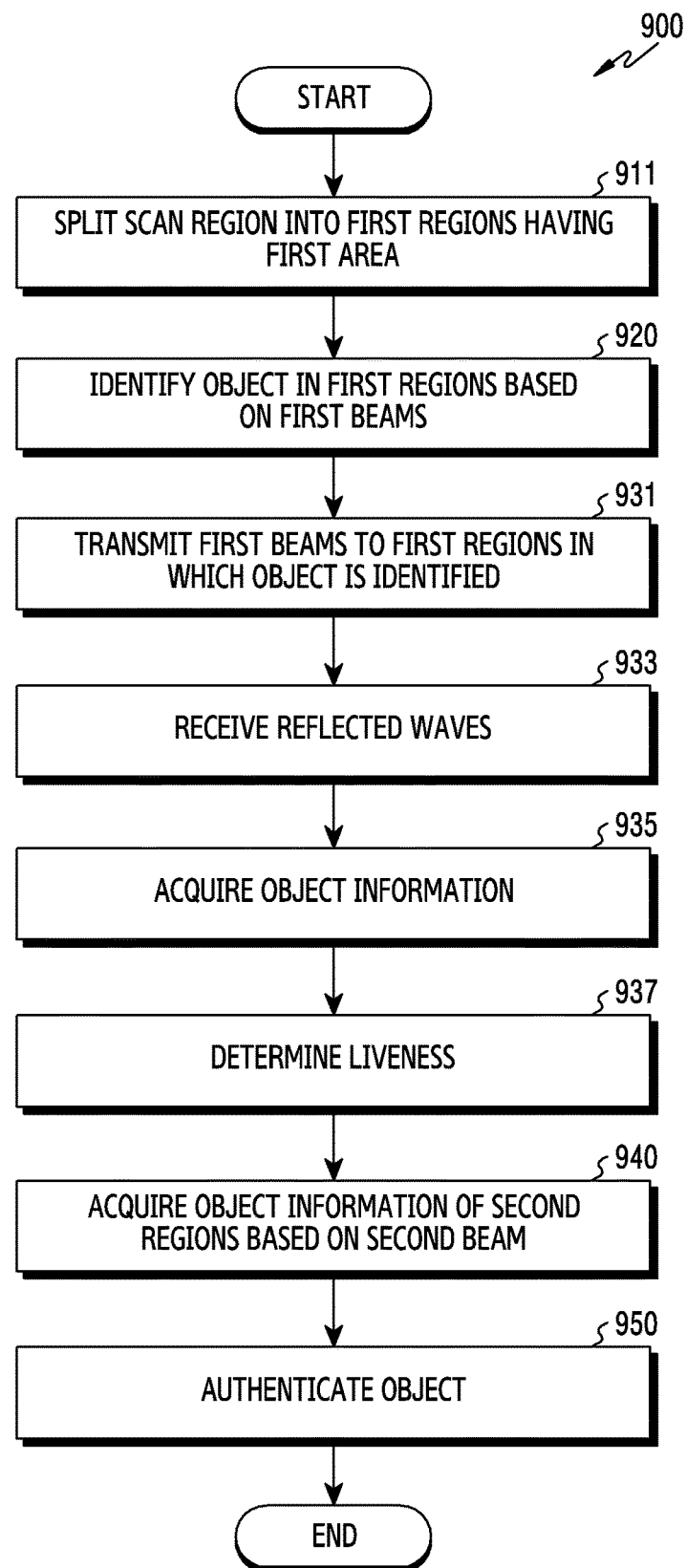
FIG. 9 illustrates a method by which an electronic device authenticates an object by determining liveness of the object according to certain embodiments.

FIG. 9 illustrates a method 900 by which an electronic device 101 (for example, the electronic device 101 of FIG. 1) determines liveness of an object 330 and authenticates the object 330 according to certain embodiments.

According to certain embodiments, the electronic device 101 may determine liveness of first regions 316, 317, 320, 321 in which the object 330 exists and authenticate the object 330. In order to identify the distance from the object 330 located in a scan region and the range of the object 330, the electronic device 101 may split the scan region into first regions 311 . . . 326 having a first area in operation 911. The electronic device 101 may transmit a sequence of first beams 340 having a first beam width to the first regions 311 . . . 326 and identify the location of the object 330 in the first regions 311 . . . 326 on the basis of first reflected waves reflected from the first regions in operation 920. Operation 920 may be performed through the same method as operations 811 to 823 of FIG. 8.

In order to determine the liveness of the object 330 (likelihood that the object is not a photograph), the electronic device 101 may perform beamforming to transmit beams to one or more first regions among the first regions 311 . . . 326 in which the location of the object 330 is identified in operation 931. For example, the first regions 311 . . . 326 in which beamforming is performed may be first regions located at the center of the scan region. For example, beams beamformed in the first regions 311 . . . 326 may be beams having a first beam width or a second beam width. The electronic device 101 may receive reflected waves reflected from the corresponding first regions 316, 317, 320, 321 in operation 933. The electronic device 101 may acquire object information on the basis of the received reflected waves in operation 935. The acquired object information may be a TOF value, a phase value, and/or an amplitude value of the reflected waves. The electronic device 101 may determine liveness of the object 330 on the basis of the acquired object information in operation 937. For example, when the object 330 is a user's face, the electronic device 101 may compare a pattern of the phase and/or the TOF of the reflected waves with a movement pattern (micro movement) of the face stored through learning (training) to determine liveness, and may determine the liveness through a comparison between an amplitude decrease pattern according to a frequency of the reflected waves with a pre-stored human skin pattern. If there is no liveness of the object 330 determined in the first regions in which the object 330 exists, the electronic device 101 may end the object authentication operation.

If there is liveness of the object 330 determined in the first regions 311 . . . 326 in which the object 330 exists, the electronic device 101 may split the first regions in which the object 330 exists into second regions 351 . . . 366 and transmit second beams having a second beam width to the second regions 351 . . . 366 in operation 940. The electronic device 101 may receive reflected waves reflected from the second regions 351 . . . 366 and acquire object information. Operation 940 may be performed through the same method as operations 825 to 835 of FIG. 8.

The electronic device 101 may perform object authentication on the basis of the acquired object information of the second regions 351 . . . 366 in operation 950. Operation 950 may be performed through the same method as operations 837 to 839 of FIG. 8.

According to certain embodiments, a method of authenticating an object 330 by an electronic device 101 may include an operation of transmitting a sequence of first directional beams having a first beam width to scan first regions 311 . . . 326 having a first area outside a housing through an antenna array 230 disposed within the housing and/or on a portion of the housing, an operation of receiving a sequence of first reflected waves generated by reflection of the sequence of the first directional beams from an object 330 through the antenna array 230, an operation of transmitting a sequence of second directional beams having a second beam width narrower than the first beam width to scan second regions 351 . . . 366, which are included in the first regions 316, 317, 320, 321 and have a second area smaller than the first area, through the antenna array 230 based on at least a portion of the received sequence of the first reflected waves, an operation of receiving a sequence of second reflected waves generated by reflection of the sequence of the second directional beams from the object 330 through the antenna array 230, and an operation of authenticating the object 330 based on at least a portion of the sequence of the second reflected waves.

According to certain embodiments, the operation of transmitting the sequence of the first directional beams may include activating the number of antennas selected from the antenna array 230 in order to determine the first beam width. The operation of transmitting the sequence of the second directional beams may include activating a larger number of antennas than the number of antennas, which are selected to determine the first beam width from the antenna array 230, in order to determine the second beam width.

According to certain embodiments, the operation of transmitting the sequence of the second directional beams may include an operation of determining a relative distance and/or a direction between the object and the electronic device 101 based on the received sequence of the first reflected waves, an operation of generating the sequence of the second directional beams to be transmitted to the second regions 351 . . . 366 included in the first regions based on the determined distance and/or direction, and an operation of transmitting the generated sequence of the second directional beams.

According to certain embodiments, the method may further include an operation of including the first regions 311 . . . 326 within a view angle of a camera 1010 disposed to face the first direction and guiding the object to be positioned in the first regions 311 . . . 326.

According to certain embodiments, the object may include a user's face.

Figure 10:
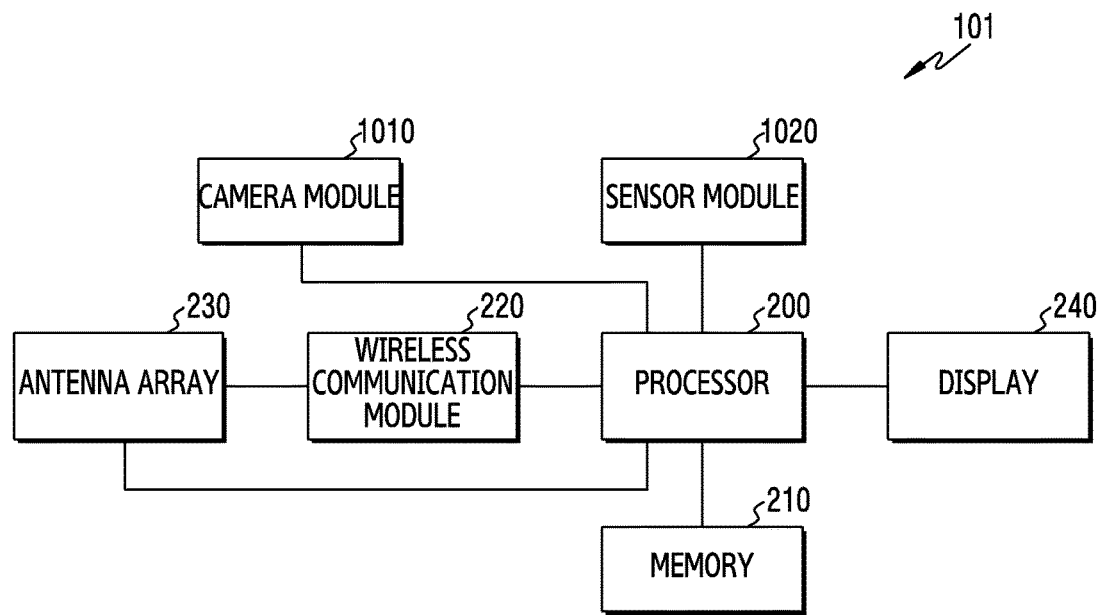
FIG. 10 illustrates the configuration of an electronic device according to certain embodiments.

FIG. 10 illustrates the configuration of an electronic device (for example, the electronic device 101 of FIG. 1) according to certain embodiments.

Referring to FIG. 10, the electronic device (for example, the electronic device 101 of FIG. 1) may include the processor 200, the memory 210, the wireless communication module 220, the antenna array 230, the display 240, a camera module 1010, and a sensor module 1020.

The camera module 1010 (for example, the camera module 180 of FIG. 8) may include an image sensor (not shown) capable of receiving light in a band of visible light reflected from an object 330 (for example, a face or iris) and generating pixel data. The camera module 1010 may be exposed through a second part of a first plate of a housing adjacent to the display 240, and may be disposed to face a first direction.

The sensor module 1020 (for example, the sensor module 176 of FIG. 1) may detect the brightness of the surrounding environment in which the object 330 exists. For example, the sensor module 1020 may include an illumination sensor.

The display 240 (for example, the display device 160 of FIG. 1) may visually provide information (for example, an image captured by the camera module 1010) to the outside of the electronic device 101. The display 240 may be exposed through a first part of the first plate of the housing.

The memory 210, the antenna array 230, the wireless communication module 220, and the display 240 may have the same configuration as the memory 210, the antenna array 230, the wireless communication module 220, and the display 240 of FIG. 2, and the operation thereof may be the same. The processor 200 (for example, the processor 120 of FIG. 1) may be located within the housing of the electronic device 101, and may be operatively connected to the camera module 1010, the display 240, the wireless communication module 220, and the antenna array 230. The processor 200 may perform an object authentication operation according to instructions stored in the memory 210.

When a request for authenticating the object is made, the processor 200 may identify the brightness of a surrounding environment in which the object 330 exists through the sensor module 1020. When ambient brightness becomes low, the processor 200 may have difficulty recognizing the object 330 from the image acquired by the camera module 1010. According to certain embodiments, if the ambient brightness is lower than a set brightness, the processor 200 may recognize the object 330 through the antenna array 230 and the wireless communication module 220. The processor 200 may beamform the first beams having the wide beam width through the wireless communication module 220 and the antenna array 230 and may transmit the first beams to the regions in which the object 330 exists so as to determine liveness of the object 330. When the liveness is determined, the processor 200 may beamform the second beams, having a narrower beam width than the first beam width, to transmit the second beams to the regions in which the object 330 exists, receive reflected waves of the second beams to acquire object information, and match the acquired object information with information learned through machine learning so as to authenticate the object 330.

When the ambient brightness is bright enough to recognize the object 330, the processor 200 may acquire and receive at least one image through the camera module 1010 and recognize the object 330 in the received image. The processor 200 may transmit a sequence of directional beams in at least one second direction, set on the basis of the image, through the wireless communication module 220 and the antenna array 230 and may receive a sequence of reflected waves generated by reflection of the sequence of the beams from the object 330. The processor 200 may authenticate the object 330 on the basis of the recognized object 330 and at least a portion of the sequence of the reflected waves.

According to certain embodiments, the wireless communication module 220 may be a millimeter-wave device. The millimeter-wave device may transmit millimeter-wave signals in the direction of the object 330 through a beamforming scheme in a direction corresponding to a specific pixel of image data and receive signals reflected from the object 330 to identify the characteristics of the reflected signals. In order to use the electronic device 101 including the millimeter-wave device to authenticate the object 330, the electronic device 101 needs to extract only reflected object information by selecting a necessary part of the object 330 and transmitting millimeter waves in the direction of the selected part of the object 330. The electronic device 101 may add a unique signal characteristic of the millimeter-wave device to the object authentication operation and thus further enhance the security level of object authentication. The electronic device 101 according to certain embodiments may reduce the time spent generating millimeter-wave image data by optimizing the selection of an object 330 part (for example, a specific location of the object 330 based on image data) to be beamformed by the millimeter-wave device on the basis of image data of an RGB camera, and as a result, it is possible to reduce a total processing time of the object authentication system.

The electronic device 101 may perform the authentication operation for acquiring an object (for example, a face) image and performing a set function. The user may capture the object by driving the camera module 1010. The processor 200 may acquire an image including an object from the camera module 1010 and recognize an object part in the acquired image. The processor 200 may extract features of a main part of the object in the image of the recognized object. The main part of the object may be a part for identifying the presence of the object or the liveness of the object or authenticating (recognizing) the object. The processor 200 may generate a sequence of beams in a direction corresponding to the extracted object part through the wireless communication module 220 and the antenna array 230 and transmit millimeter waves. The processor 200 may receive a sequence of beams reflected from the object through the wireless communication module 220 and the antenna array 230. The processor 200 may learn information on main parts of the object through deep learning, an artificial neural network, or a deep neural network. The memory 210 may store learned information on the main parts of the object. When reflected information on the main parts of the object is received from the wireless communication module 220, the processor 220 may identify output of a deep-earning system that matches a characteristic of the main part of the object stored in the memory 210 with a characteristic based on received reflected wave information and determine whether the output is a result corresponding to the object of the user.

According to certain embodiments, the electronic device 101 may use a machine-learning engine for both object image recognition and reflected wave recognition as one machine-learning engine. According to an embodiment, the electronic device 101 may separately use a machine-learning engine for object image recognition and a machine-learning engine for reflected wave recognition.

According to an embodiment, the processor 200 may recognize the object part in the image data acquired and received by the camera module 1010 and set authentication identification locations for authenticating the object in the image of the recognized object. The processor 200 may transmit millimeter waves to the authentication identification locations through beamforming using the antenna array 230 and receive millimeter waves reflected from the object so as to authenticate whether the object corresponds to the set object of the user. The object authentication operation may be performed on the basis of a deep-learning algorithm.

According to an embodiment, the processor 200 may recognize the object part in the image data acquired and received by the camera module 1010 and set liveness determination locations for determining liveness of the object and authentication identification locations for authenticating the object in the image of the recognized object. For example, the identification locations may be specific parts such as an eye, a nose, or a mouth or may be parts that can effectively express a user's characteristic. Further, predetermined locations may vary depending on information of image data (for example, an angle of the face). For example, the liveness determination locations may be parts such as an eye, a nose, and a mouth in which a user's minute movement can be detected. For example, the authentication identification locations may be the entire facial region or locations of the eye, the nose, or the mouth, which define the user's face.

The processor 200 may transmit millimeter waves to the identified liveness determination locations through beamforming and receive millimeter waves reflected from the object so as to determine the liveness of the object. For example, the processor 200 may transmit millimeter waves to the authentication identification locations through beamforming and receive millimeter waves reflected from the object so as to authenticate whether the object corresponds to the set object of the user. The liveness determination and object authentication operation may be performed on the basis of a deep-learning algorithm.

Figure 11:
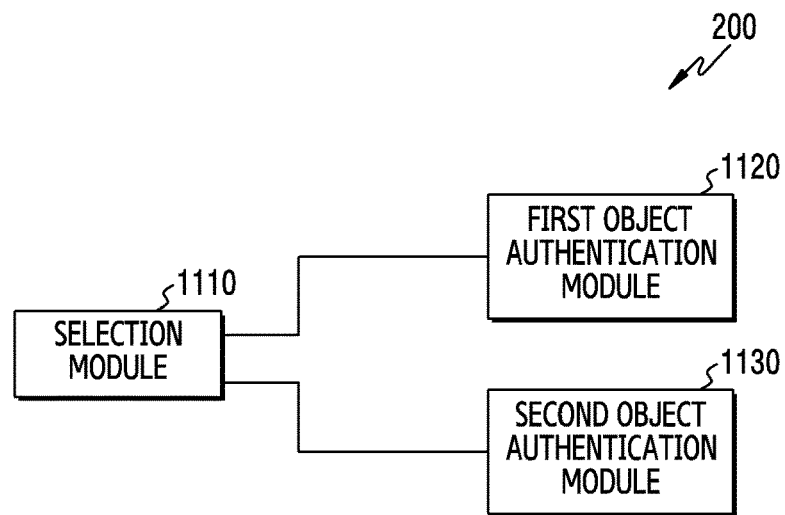
FIG. 11 illustrates the configuration of an electronic device according to certain embodiments.

FIG. 11 illustrates the configuration of an electronic device according to certain embodiments.

Referring to FIG. 11, an electronic device (the electronic device 101 of FIG. 1) may include a selection module 1110, a first object authentication module 1120, and a second object authentication module 1130. The electronic device 101 of FIG. 1 may be the configuration of a processor (for example, the processor 120 of FIG. 1 or the processor 200 of FIG. 10).

The selection module 1110 may acquire information about brightness in the vicinity of the object 330 through a sensor module (for example, the sensor module 1020 of FIG. 10). The selection module 1110 may identify whether the intensity of light acquired through the sensor module 1020 is out of a specific range and select the first object authentication module 1120 when the intensity of light is out of the specific range and select the second authentication module 1130 when the intensity of light has a value within the specific range.

The first object authentication module 1120 may perform an operation of authenticating the object 330 by identifying the distance from the object 330 and the range of the object 330 through beamforming of first beams, acquiring object information in regions in which the object 330 exists through beamforming of second beams, and matching the acquired object information with learned data. The first object authentication module 1120 may have the same configuration as that shown in FIG. 6.

The second object authentication module 1130 may perform an operation of authenticating the object 330 by recognizing an image acquired through the camera module 1010, extracting object 330 regions and feature points of the object 330, forming beams to the recognized object 330 regions through the wireless communication module 220 and the antenna array 230, acquiring liveness of the object 330 and object information, and matching the acquired object information with learned data.

According to an embodiment, the electronic device 101 may receive a signal of an intensity of light around the object 330 through the sensor module 1020 and identify whether the intensity of the received light is equal or lower than a predetermined brightens. When the intensity of the light is equal to or lower than the predetermined brightness, it may be difficult to recognize an image acquired by the camera module 1010. When it is difficult to recognize the image acquired through the camera module 1020, the processor 200 may activate the first object authentication module 1120 to perform the object authentication operation through the wireless communication module 220 and the antenna array 230 (for example, a millimeter-wave device). When the object authentication operation is performed using only the millimeter-wave device, the processor 200 may display a message for guiding the object to be positioned within a view angle of the camera module 1010 through the display 240.

The configuration of the first object authentication module 1120 of the electronic device 101 may be the same as that of FIG. 6. When the electronic device 101 performs the object authentication operation through the first object authentication module 1120, the object authentication method may be the same as that of FIGS. 7 to 9.

When it is determined that the intensity of light is bright enough to recognize the image acquired through the camera module 1020, the processor 200 may perform the object authentication operation by activating the second object authentication module 1130.

Figure 12:
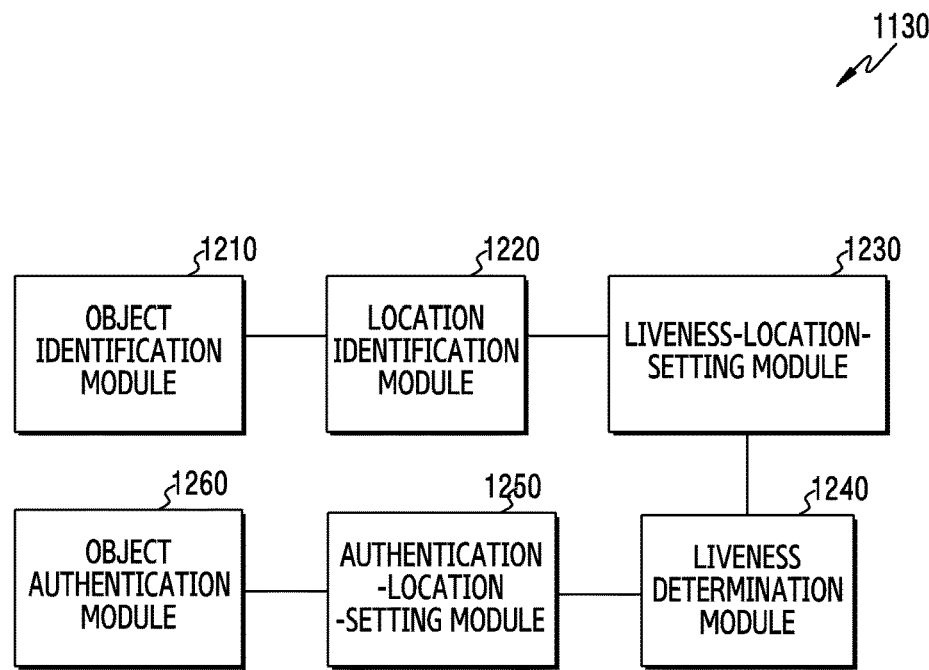
FIG. 12 illustrates the configuration of an electronic device for performing a second object authentication operation according to certain embodiments.

FIG. 12 illustrates the configuration of an electronic device (for example, the electronic device 101 of FIG. 1) for performing a second object authentication operation according to certain embodiments.

Referring to FIG. 12, the electronic device (for example, the electronic device 101 of FIG. 1) may include an object identification module 1210, a location identification module 1220, a liveness-location-setting module 1230, a liveness determination module 1240, an authentication-location-setting module 1250, and an object authentication module 1260. The configuration of the electronic device 100 of FIG. 12 may be the configuration of the second object authentication module 1130 of FIG. 11.

The object identification module 1210 may acquire image data from a camera module (for example, the camera module 180 of FIG. 1 or the camera module 1010 of FIG. 10). The object identification module 1210 may identify an image of an object 330 (face detection) in the acquired image. For example, in order to identify objects in various sizes, the object authentication module 1210 may generate a pyramid image in the acquired image and determine whether a region having a specific size is the object 330 through a classifier (for example, AdaBoost (adaptive boosting)) while moving the image one pixel at a time.

The location identification module 1220 may identify the main feature (facial feature or facial landmark) of the object in the image of the identified object. According to certain embodiments, when the object is a user's face, the location identification module 1220 may specify an eye, a nose, or a mouth and also a facial region. For example, the location identification module 1220 may detect (feature detection or landmark detection) a location (for example, a central location of the image) for identifying the presence of the object in the image of the object, a location (for example, a specific location of the face in which movement of the eye, the nose, or the mouth can be detected) for determining liveness of the object, and a location (for example, the entire facial region or a plurality of locations of the eye, the nose, or the mouth in which facial features can be identified) for authenticating the face.

The liveness-location-setting module 1230 may select object locations (for example, specific pixel locations of the image of the object) for determining liveness of the object (liveness detection) and perform beamforming through the wireless communication module 220 and the antenna array 230 in order to transmit a sequence of beams to the selected object locations. The wireless communication module 220 and the antenna array 230 may transmit a sequence of beams based on liveness beamforming information (azimuth) set by the liveness-location-setting module 1230 in a corresponding direction and receive signals reflected from the subject.

The liveness determination module 1240 may determine liveness of the object on the basis of signals reflected from the subject which are received by the antenna array 230. The liveness determination module 1240 may calculate a TOF, phase, and/or amplitude of the received reflected signals and determine liveness on the basis of liveness templates having calculation information stored in the memory 210.

The authentication-location-setting module 1250 may select object locations (for example, an entire region of a facial image or a set of feature points including a plurality of feature points) for authenticating the object and perform beamforming in order to transmit a sequence of beams to the selected locations. The wireless communication module and the antenna array may transmit a sequence of beams based on beamforming information (azimuth and elevation) for object authentication set by the authentication-location-setting module 1250 in a corresponding direction and receive signals reflected from the subject.

The object authentication module 1260 may authenticate the image of the object on the basis of the received signals reflected from the subject. The object authentication module 1260 may calculate a TOF, phase, and/or amplitude of the received reflected signals and authenticate an object of the user in the image on the basis of object authentication templates having calculation information stored in the memory. The liveness-location-setting module 1230 may determine locations for measuring minute movement of the object, and the liveness determination locations may be used to measure the distance from the object. For example, the liveness determination locations may be the object regions or portions of the object regions. The object authentication module 1260 may perform object authentication through deep-learning information on the basis of object information (for example, TOF of information on the distance from the object).

The electronic device 101 according to certain embodiments may determine liveness of the object in the acquired image through the millimeter-wave device, and when there is liveness of the object, authenticate the image of the object. For example, an object that is a part of a human may continuously generate movement at a micro-meter level even when the object stays still. Such movement may continuously vibrate a phase value or a TOF value for reflected waves of the millimeter-wave device. The electronic device 101 may store in advance movement features in a specific pattern in a storage unit (for example, the memory 210) through a deep-learning scheme (or a machine-learning scheme). Further, reflected waves from human skin may have characteristics different from those of objects having a different pattern of reduction in reflected wave amplitude. The electronic device 101 may also have stored in advance the reflected wave amplitude reduction pattern in the storage unit. The liveness-location-setting module 1230 may perform a beamforming operation to transmit a sequence of beams to set locations (for example, the locations of the eyes, nose, or mouth of the image of the object) for determining liveness and may receive signals reflected from the object of the subject. The liveness determination module 1240 may compare the pattern of the phase or TOF of the millimeter-wave image data with a micro movement pattern of the object stored in the memory through learning (training) or with a human's skin pattern, of which the amplitude reduction pattern according to the frequency of the reflected waves is pre-stored, so as to determine liveness.

When the electronic device 101 identifies the liveness (when a condition of liveness determination (liveness detection) is satisfied or when a characteristic of the reflected waves is recognized to be similar to reflected wave signals for an object that is a part of a human), the authentication-location-setting module 1250 may perform an additional beamforming operation in a direction of the locations of the object for object authentication (for example, the object regions or a portion of the regions of the object including a plurality of feature points in the object regions). The electronic device 101 may additionally transmit a sequence of beams to the locations of the object of the subject for object authentication and receive signals reflected from the corresponding object locations of the subject. The object authentication module 1260 may authenticate the object of the user on the basis of the image of the recognized object, the sequence of the reflected waves, and the object authentication templates stored in the memory.

According to certain embodiments, when the millimeter-wave image data is generated, the electronic device 101 may perform an operation for comparing the millimeter-wave image data with data (templates) already generated through image learning through a feature extraction operation of a deep-learning (for example, CNN) algorithm and determine success or failure of object authentication by calculating matching scores according to a previously determined algorithm. When the object authentication succeeds or fails, the electronic device 101 may use the pre-stored templates of the object as additional data for continuous update.

An electronic device 101 according to certain embodiments may include a housing comprising a first plate facing a first direction, a second plate facing a direction opposite the direction faced by the first plate, and a side member surrounding a space between the first plate and the second plate, a display 240 exposed through a first part of the first plate, a camera module 1010 exposed through a second part of the first plate adjacent to the display 240 and disposed to face the first direction, an antenna array 230 disposed within the housing and/or on a portion of the housing, a wireless communication module 220 electrically connected to the antenna array 230 and configured to form directional beams through the antenna array 230, a sensor module 1020 configured to sense an intensity of illumination, and a processor 200 located within the housing and operatively connected to the display 240, the camera module 1010, the wireless communication module 220, and the sensor module 1020. The processor 200 may identify the brightness in the vicinity of the electronic device through the sensor module, perform a first object authentication operation through the antenna array 230 and the wireless communication module 220 when the sensed brightness is equal to or lower than a set level, and perform a second object authentication operation through the camera module 1010, the antenna array 230 and the wireless communication module 220 when the sensed brightness is higher than the set level The first object authentication operation may transmit a sequence of first directional beams having a first beam width to scan first regions 311 . . . 326 having a first area through the antenna array 230, receive a sequence of first reflected waves generated by reflection of the sequence of the first directional beams from an object 330 through the antenna array 230, transmit a sequence of second directional beams having a second beam width narrower than the first beam width to scan second regions 351 . . . 366, which are included in the first regions and have a second area smaller than the first area, through the antenna array 230 based on at least a portion of the received sequence of the first reflected waves, receive a sequence of second reflected waves generated by reflection of the sequence of the second directional beams from the object 330 through the antenna array 230, and authenticate the object 330 based on at least a portion of the sequence of the second reflected waves.

According to certain embodiments, the second object authentication operation of the processor 200 may acquire at least one image through the camera module 1010, recognize the object 330 in the image, transmit a sequence of at least one directional beam in the direction of the object 330 through the antenna array 230, receive a sequence of reflected waves generated by reflection of the sequence of the beams from the object 330 through the antenna array 230, and authenticate the object 330 based on the recognized object 330 and at least a portion of the sequence of the reflected waves.

According to certain embodiments, the processor 200 may activate the antennas selected from the antenna array in order to determine the first beam width and/or the second beam width.

According to certain embodiments, the processor 200 may determine a relative distance and/or a direction between the object and the electronic device based on the sequence of the first reflected waves.

Figure 13:
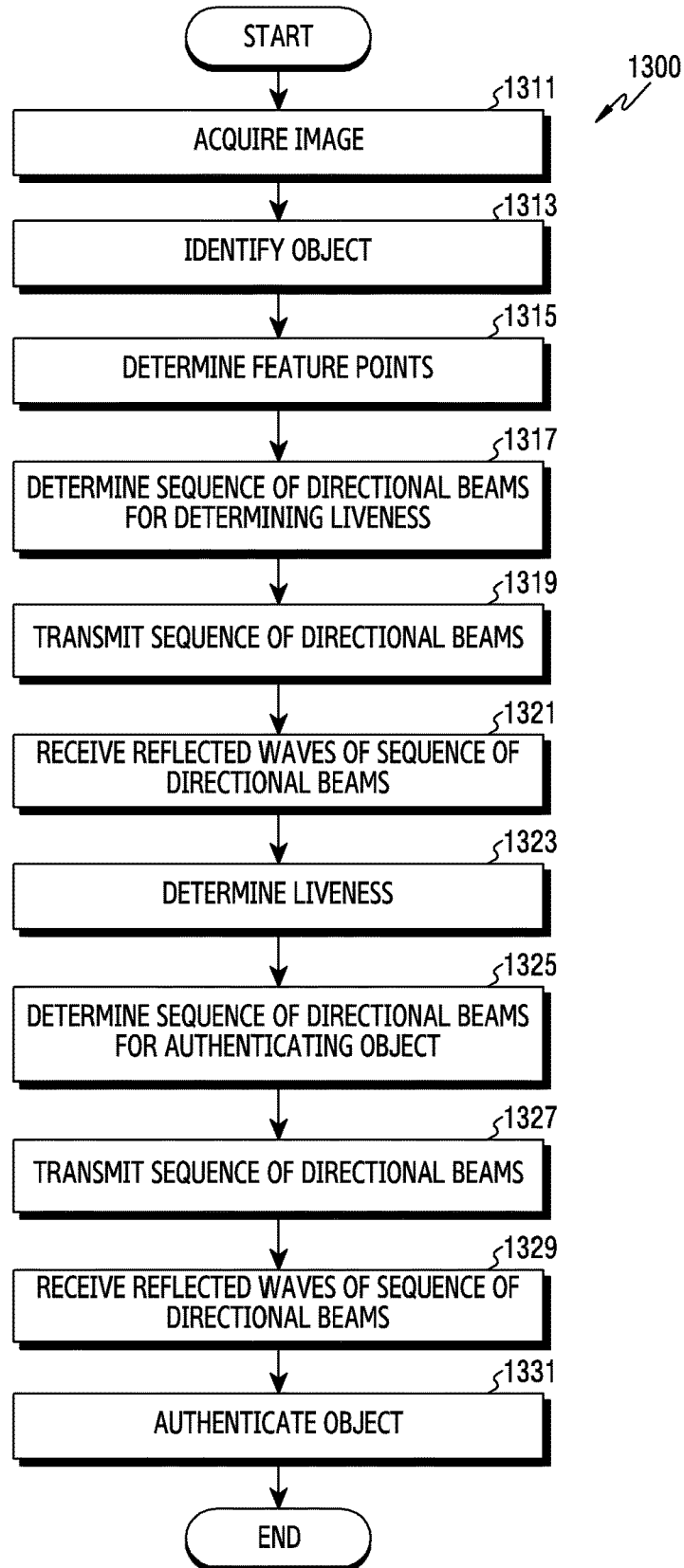
FIG. 13 is a flowchart illustrating a method by which an electronic device authenticates an object on the basis of a camera image and beams according to certain embodiments.

According to certain embodiments, the camera module 1010 may include an image sensor disposed to face the first direction, and the processor 200 may include the first regions 311 . . . 326 in a view angle of the image sensor. FIG. 13 is a flowchart illustrating a method 1300 by which an electronic device (for example, the electronic device 101 of FIG. 1) authenticates an object 330 on the basis of a camera image and beams according to certain embodiments.

FIG. 13 is a flowchart illustrating a second object authentication method by the electronic device 101 according to certain embodiments.

Referring to FIG. 13, the electronic device 101 may acquire an image including an object 330 through a camera module (for example, the camera module 180 of FIG. 1 or the camera module 1010 of FIG. 10) in operation 1311. The electronic device 101 may identify object 330 regions and main parts of the object 330 in the acquired image in operation 1313. The electronic device 101 may identify feature points for authenticating the object 330 in the image of the recognized object in operation 1315. The electronic device 101 may calculate coordinates of object 330 regions or locations (for example, pixel coordinates) of parts that may be feature points of the object 330 in the image acquired through the camera module 1010. The electronic device 101 may select locations for determining liveness of the object 330 and locations for authenticating the object 330. For example, when the object 330 is a user's face, the locations for determining liveness may be pixel coordinates of specific parts that may be feature points of the face, such as the eyes, nose, or mouth in the face image, and the locations for authenticating the face may be a set of pixel coordinates that can be collected in the entire region of the face image within a limited time.

The electronic device 101 may determine a sequence of directional beams for determining liveness of the object 330 in operation 1317. For example, the electronic device 101 may calculate an azimuth and an elevation of the beams for determining liveness by applying liveness determination location information to Equation (2) or Equation (3). The electronic device 101 may transmit the sequence of the beams to the liveness determination locations on the basis of the calculated azimuth and elevation in operation 1319. The electronic device 101 may receive reflected waves of the beams reflected from the subject in operation 1321. For example, the electronic device 101 may receive reflected waves of beams reflected from the subject through the antenna array 230. The electronic device 101 may calculate phase, TOF and/or amplitude values from the received reflected waves and determine liveness of the object 330 on the basis of the calculated values in operation 1323. According to an embodiment, the memory (for example, the memory 210 of FIG. 10) may store liveness templates for determining liveness of the object 330. For example, the liveness templates may be specific values generated by learning changes in phase, TOF, and/or amplitude of the millimeter-wave device based on minute movement (vibration) of the object 330 through a deep-learning scheme. The electronic device 101 may identify matching scores by matching the phase, TOF, and/or amplitude values of the reflected waves received by the millimeter-wave device with the learned liveness templates and determine liveness of the object 330 on the basis of the identified matching scores. When there is no liveness of the object 330 (false), the electronic device 101 may determine that object authentication fails and end the authentication operation.

When there is liveness of the object 330 (true), the electronic device 101 may identify whether there is additional location information for object authentication (location information (pixel coordinates) for object authentication) in operation 1325. For example, the memory may store a liveness template and an object authentication template, and the electronic device 101 may determine feature points for liveness determination and object authentication on the basis of operation 1315. The electronic device 101 may determine a sequence of directional beams for object authentication in operation 1325. For example, the electronic device 101 may calculate an azimuth and an elevation of beams for predetermined locations of the image of the object 330 in order to authenticate the object 330 by applying object authentication location information to Equation (2) or Equation (3). The electronic device 101 may transmit the sequence of the beams to the object authentication locations of the subject on the basis of the calculated azimuth and elevation in operation 1327. The electronic device 101 may receive reflected waves of the sequence of the directional beams reflected from the subject in operation 1329. The electronic device 101 may calculate phase, TOF, and amplitude values from the reflected waves received through the antenna array 230 and match the calculated values with the object authentication template so as to perform the object authentication operation.

A method of authenticating an object 330 by an electronic device 101 according to certain embodiments may include an operation of sensing a brightness around the electronic device 101 through a sensor module 1020, an operation of performing a first object 330 authentication operation using signals received through an antenna array 230 disposed within a housing of the electronic device 101 and/or on a portion of the housing and a wireless communication module 220 when the sensed brightness is equal to or lower than a set level, and an operation of performing a second object 330 authentication operation for authenticating the object 330 through an image acquired by a camera 1010 and signals received through the antenna array 230 and the wireless communication module 220 when the sensed brightness is higher than or equal to the set level. The first object 330 authentication operation may transmit a sequence of first directional beams having a first beam width to scan first regions having a first area through the antenna array 230, receive a sequence of first reflected waves generated by reflection of the sequence of the first directional beams from an object 330 through the antenna array 230, transmit a sequence of second directional beams having a second beam width narrower than the first beam width to scan second regions 351 . . . 366, which are included in the first regions and have a second area smaller than the first area, through the antenna array 230 based on at least a portion of the received sequence of the first reflected waves, receive a sequence of second reflected waves generated by reflection of the sequence of the second directional beams from the object 330 through the antenna array 230, and authenticate the object 330 based on at least a portion of the sequence of the second reflected waves.

According to certain embodiments, the second object authentication operation may include an operation of acquiring at least one image through the camera 1010, an operation of recognizing the object in the image, an operation of transmitting a sequence of at least one directional beam in a direction of the object through the antenna array 230, an operation of receiving a sequence of reflected waves generated by reflection of the sequence of the beams from the object through the antenna array 230, and an operation of authenticating the object based on the recognized object and at least a portion of the sequence of the reflected waves.

According to certain embodiments, the operation of transmitting the sequence of the first directional beams may include activating the number of antennas selected from the antenna array in order to determine the first beam width. The operation of transmitting the sequence of the second directional beams may include activating a larger number of antennas than the number of antennas selected to determine the first beam width from the antenna array in order to determine the second beam width.

According to certain embodiments, the operation of transmitting the sequence of the second directional beams may further include an operation of determining a relative distance and/or a direction between the object and the electronic device based on the sequence of the first reflected waves, an operation of generating the sequence of the second directional beams to be transmitted to the second regions 351 . . . 366 included in the first regions based on the determined distance and/or direction, and an operation of transmitting the generated sequence of the second directional beams.

According to certain embodiments, the first object authentication operation may further include an operation of setting the first regions to be included within a view angle of the camera 1010 and guiding the object to be positioned in the first regions.

While the disclosure has been shown and described with reference to certain embodiments thereof, it will be apparent to those skilled in the art that the electronic device according to the disclosure is not limited to these embodiments, and various changes in form and details may be made therein without departing from the spirit and scope of the disclosure as defined by the appended claims.

What is claimed is:

1. An electronic device comprising:
an antenna array including a plurality of antennas;
a wireless communication module electrically connected to the antenna array and configured to form directional beams through the antenna array;
at least one processor operatively coupled to the wireless communication module; and
a memory operatively coupled to the at least one processor,
wherein the memory stores instructions that, when executed, cause the at least one processor to:
identify a type of an object based on information received from a user interface or a camera;
control a first beam width based on a predicted distance of the identified type of the object;
transmit a sequence of first directional beams having the first beam width to scan first regions having a first size through the antenna array, the first beam width being determined based on activating a first number of antenna among the plurality of antennas included in the antenna array,
receive a sequence of first reflected waves generated by reflection of the sequence of the first directional beams from the object through the antenna array within a predetermined time threshold, wherein the first reflected waves are reflected from some of the first regions, wherein the some of the first regions are divided into second regions;
transmit a sequence of second directional beams having a second beam width narrower than the first beam width to selectively scan second regions of the some of the first regions that reflected the sequence of first reflected waves, and having a second size smaller than the first size, through the antenna array based on at least a portion of the received sequence of the first reflected waves, the second beam width being determined based on activating a second number of antenna among the plurality of antennas included in the antenna array,
receive a sequence of second reflected waves generated by reflection of the sequence of the second directional beams from the object through the antenna array, and
authenticate the object based on at least a portion of the sequence of the second reflected waves.

2. The electronic device of claim 1, wherein the second number is larger than the first number.

3. The electronic device of claim 1, wherein the instructions that, when executed, further cause the at least one processor to determine a relative distance or a direction between the object and the electronic device based on the sequence of the first reflected waves.

4. The electronic device of claim 1, further comprising: a housing comprising a first plate facing a first direction, a second plate facing a direction opposite the direction faced by the first plate, and a side member surrounding a spaced between the first plate and the second plate; a display exposed through a first part of the first plate; and an image sensor exposed through a second part of the first plate and disposed to face the first direction, and wherein the instructions that, when executed, further cause the at least one processor to identify the first regions in a view angle of the image sensor.

5. The electronic device of claim 1, wherein the object includes a user's face.

6. A method of authenticating an object by an electronic device, the method comprising:
identifying a type of the object based on information received from a user interface or a camera;
control a first beam width based on a predicted distance of the identified type of the object;
transmitting a sequence of first directional beams having the first beam width to scan first regions having a first size through an antenna array, the first beam width being determined based on activating a first number of antenna among a plurality of antennas included in the antenna array;
receiving a sequence of first reflected waves generated by reflection of the sequence of the first directional beams from the object through the antenna array within a predetermined time threshold, wherein the first reflected waves are reflected from some of the first regions, wherein the some of the first regions are divided into second regions;

transmitting a sequence of second directional beams having a second beam width narrower than the first beam width to selectively scan second regions of the some of the first regions that reflected the sequence of first reflected waves, and having a second size smaller than the first size, through the antenna array based on at least a portion of the received sequence of the first reflected waves, the second beam width being determined based on activating a second number of antenna among the plurality of antennas included in the antenna array;

receiving a sequence of second reflected waves generated by reflection of the sequence of the second directional beams from the object through the antenna array; and authenticating the object based on at least a portion of the sequence of the second reflected waves.

7. The method of claim 6, wherein the second number is larger than the first number.

8. The method of claim 6, wherein the transmitting of the sequence of the second directional beams comprises: determining a relative distance or a direction between the object and the electronic device based on the received sequence of the first reflected waves; generating the sequence of the second directional beams to be transmitted to the second regions based on the determined relative distance and/or direction; and transmitting the generated sequence of the second directional beams.

9. The method of claim 6, further comprising including the first regions within a view angle of a camera disposed to face a first direction and guiding the object to be positioned in the first regions.

10. The method of claim 6, wherein the object includes a face of a user.

\* \* \* \* \*